United States Patent
Feltham

(10) Patent No.: US 12,485,725 B2
(45) Date of Patent: Dec. 2, 2025

(54) ADAPTIVE VEHICLE HVAC SYSTEM DEPENDENT ON OPERATOR LOCATION RELATIVE TO VEHICLE

(71) Applicant: Rivian IP Holdings, LLC, Plymouth, MI (US)

(72) Inventor: Graham Lloyd Feltham, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 96 days.

(21) Appl. No.: 17/959,529

(22) Filed: Oct. 4, 2022

(65) Prior Publication Data

US 2023/0191873 A1 Jun. 22, 2023

Related U.S. Application Data

(60) Provisional application No. 63/291,199, filed on Dec. 17, 2021.

(51) Int. Cl.
*B60H 1/00* (2006.01)

(52) U.S. Cl.
CPC ..... *B60H 1/00742* (2013.01); *B60H 1/00378* (2013.01); *B60H 1/0073* (2019.05)

(58) Field of Classification Search
CPC ............ B60H 1/00742; B60H 1/00378; B60H 1/0073; B60H 1/00871; B60H 2001/003; B60H 1/00285; B60H 1/00821; B60H 1/00878; B60H 2001/0015

See application file for complete search history.

(56) References Cited

U.S. PATENT DOCUMENTS

| | | |
|---|---|---|
| 7,962,441 B2 | 6/2011 | Kojima et al. |
| 9,744,889 B2 | 8/2017 | Kawashima |
| 10,675,943 B2 | 6/2020 | Filipkowski |
| 11,279,206 B1 | 3/2022 | Mueller et al. |
| 11,338,641 B2 | 5/2022 | Hendry et al. |
| 11,397,014 B2 | 7/2022 | Bhosale et al. |
| 11,535,131 B1 | 12/2022 | Feltham et al. |

(Continued)

FOREIGN PATENT DOCUMENTS

| | | |
|---|---|---|
| CA | 2644887 A1 | 6/2009 |
| CN | 114425977 A | 5/2022 |

(Continued)

OTHER PUBLICATIONS

Ates, et al., "Heating and cooling vehicle seat via air conditioner coils," EPJ Web of Conferences 213, 02009(2018), pp. 1-11 (https://www.epj-conferences.org/articles/epjconf/pdf/2019/18/epjconf_emf18_02009.pdf) (Year: 2018).

(Continued)

*Primary Examiner* — Matthew J. Reda
(74) *Attorney, Agent, or Firm* — Haley Guiliano LLP

(57) ABSTRACT

Systems and methods are provided for determining, by processing circuitry, a vehicle occupant has left a cabin of a vehicle (or that the cabin is unoccupied), where the vehicle comprises a heating, ventilation, and air conditioning (HVAC) system. In response to determining the vehicle occupant has left the cabin (or the cabin is unoccupied), the processing circuitry may adjust a parameter of the HVAC system.

20 Claims, 13 Drawing Sheets

(56) References Cited

U.S. PATENT DOCUMENTS

| | | |
|---|---|---|
| 2004/0069444 A1 | 4/2004 | Clifford |
| 2005/0268621 A1 | 12/2005 | Kadle et al. |
| 2007/0024708 A1* | 2/2007 | Lin .................. H04N 7/181 |
| | | 348/E7.086 |
| 2009/0250980 A1 | 10/2009 | Major et al. |
| 2010/0082201 A1* | 4/2010 | Pfau .................. B60H 1/00828 |
| | | 701/36 |
| 2010/0236770 A1 | 9/2010 | Pursifull |
| 2011/0166747 A1 | 7/2011 | Wijaya et al. |
| 2012/0090814 A1 | 4/2012 | Crosier et al. |
| 2012/0312520 A1 | 12/2012 | Hoke et al. |
| 2013/0037252 A1 | 2/2013 | Major et al. |
| 2013/0232996 A1 | 9/2013 | Goenka et al. |
| 2014/0250924 A1* | 9/2014 | Huang .................. F24F 11/46 |
| | | 62/56 |
| 2015/0025738 A1 | 1/2015 | Tumas et al. |
| 2015/0056906 A1 | 2/2015 | Fujii et al. |
| 2015/0136376 A1 | 5/2015 | Niemann et al. |
| 2015/0239320 A1* | 8/2015 | Eisenhour .......... B60H 1/00864 |
| | | 454/75 |
| 2015/0298523 A1* | 10/2015 | Patel .................. B60H 1/2206 |
| | | 237/12.3 C |
| 2016/0223998 A1* | 8/2016 | Songkakul .......... G05B 15/02 |
| 2016/0325655 A1 | 11/2016 | Joshi |
| 2017/0182861 A1 | 6/2017 | Steinman et al. |
| 2017/0211838 A1* | 7/2017 | Child .................. F24F 11/30 |
| 2018/0009288 A1 | 1/2018 | Bhasin et al. |
| 2018/0022181 A1 | 1/2018 | Sawyer et al. |
| 2018/0134120 A1 | 5/2018 | Marginean et al. |
| 2018/0162191 A1 | 6/2018 | Lee et al. |
| 2018/0215293 A1 | 8/2018 | Gandhi et al. |
| 2018/0265094 A1 | 9/2018 | Graney |
| 2019/0019494 A1* | 1/2019 | Wheeler ............ G10K 11/178 |
| 2019/0077217 A1 | 3/2019 | Yu et al. |
| 2019/0092119 A1 | 3/2019 | Tsunoda |
| 2019/0184789 A1* | 6/2019 | Aizawa ............ B60H 1/00742 |
| 2020/0094651 A1* | 3/2020 | Ostrowski .......... G06N 20/00 |
| 2020/0101818 A1* | 4/2020 | Holmstrom ........ B60H 1/00785 |
| 2020/0148032 A1 | 5/2020 | Skapof et al. |
| 2020/0180387 A1 | 6/2020 | Sarma |
| 2020/0362808 A1* | 11/2020 | Cosgrove ............ B60H 1/322 |
| 2021/0018202 A1 | 1/2021 | Atchison et al. |
| 2021/0053421 A1 | 2/2021 | Chiritescu |
| 2021/0070132 A1 | 3/2021 | Kwon et al. |
| 2021/0170827 A1 | 6/2021 | Jeong |
| 2021/0188035 A1 | 6/2021 | Marshall et al. |
| 2021/0347216 A1* | 11/2021 | Robertson ............ B60D 1/145 |
| 2022/0390938 A1* | 12/2022 | Villar .................. B60K 35/10 |
| 2023/0191871 A1 | 6/2023 | Feltham et al. |
| 2023/0302871 A1 | 9/2023 | Makita et al. |
| 2024/0017591 A1 | 1/2024 | Feltham |

FOREIGN PATENT DOCUMENTS

| | | |
|---|---|---|
| DE | 102019111731 A1 | 12/2019 |
| GB | 2612049 A | 4/2023 |
| JP | 2004-283403 A | 10/2004 |
| JP | 3714261 B2 | 11/2005 |
| KR | 10-0331744 B1 | 5/2002 |
| KR | 10-0601834 B1 | 7/2006 |
| KR | 10-2006-0106507 A | 10/2006 |
| KR | 10-2008-0010670 A | 1/2008 |
| KR | 10-2008-0042220 A | 5/2008 |
| KR | 10-2008-0051412 A | 6/2008 |
| KR | 10-2009-0036370 A | 4/2009 |
| KR | 10-2010-0006962 A | 1/2010 |
| KR | 10-2010-0007431 A | 1/2010 |
| KR | 10-2010-0042316 A | 4/2010 |
| KR | 10-2011-0030798 A | 3/2011 |
| KR | 10-1200755 B1 | 11/2012 |
| KR | 10-1201299 B1 | 11/2012 |
| KR | 10-1201301 B1 | 11/2012 |
| WO | 2006/117690 A2 | 11/2006 |
| WO | 2012/066226 A1 | 5/2012 |
| WO | 2020/065205 A1 | 4/2020 |
| WO | 2020/065219 A1 | 4/2020 |
| WO | 2020/108858 A1 | 6/2020 |
| WO | 2021/112129 A1 | 6/2021 |
| WO | 2022/190474 A1 | 9/2022 |
| WO | 2023/244758 A1 | 12/2023 |

OTHER PUBLICATIONS

Farzaneh, et al., "Intelligent control of thermal comfort in automobile" 2008 IEEE Conference on Cybernetics and Intelligent Systems, Chengdu, China, 2008, pp. 510-514, doi: 10.1109/ICCIS.2008.4670809. (https://ieeexplore.ieee.org/document/4670809) (Year: 2008).

Vinoth, et al., "Automated car safety seat cooling system using thermoelectric cooler," 2014 International Conference on Computation of Power, Energy, Information and Communication (ICCPEIC), Chennai, India, 2014, pp. 488-493, (https://ieeexplore.ieee.org/document/6915413) (Year: 2014).

ClimateSense™ | Personal Climate Control—Gentherm "https://web.archive.org/web/20211017034510/https://gentherm.com/en/solutions/automotive/climatesense," Oct. 17, 2021.

* cited by examiner

ADAPTIVE VEHICLE HVAC SYSTEM DEPENDENT ON OPERATOR LOCATION RELATIVE TO VEHICLE

CROSS-REFERENCE TO RELATED APPLICATIONS

This application claims the benefit of U.S. Provisional Application No. 63/291,199, filed Dec. 17, 2021, the disclosure of which is hereby incorporated by reference herein in its entirety. In addition, the disclosure of commonly owned application Ser. No. 17/959,669, filed Oct. 4, 2022 and entitled "VEHICLE SEAT FOR STORING THERMAL ENERGY FOR OCCUPANT COMFORT," which claims the benefit of U.S. Provisional Application No. 63/291,202, is hereby incorporated by reference herein in its entirety.

INTRODUCTION

Many delivery drivers (e.g., employed or contracted by e-commerce companies) spend up to 10 hours per day, and 4-5 days a week, delivering packages to consumers or businesses. In performing these deliveries, the vehicle doors may be opened and closed hundreds of times per day, the location of the vehicle may change often, and the vehicle may be exposed to various thermal operating environments and conditions, ranging from extreme hot with high sun, to extreme cold. Under such circumstances, it may be difficult to efficiently maintain thermal conditions for the vehicle.

SUMMARY

Accordingly, systems, vehicles and methods are disclosed herein for efficiently maintaining the thermal conditions of electric vehicles. In some embodiments, a vehicle is provided which comprises a heating, ventilation, and air conditioning (HVAC) system, and processing circuitry configured to determine a vehicle occupant has left a cabin of the vehicle while the HVAC system of the vehicle is in operation, and in response to determining the vehicle occupant has left the cabin, adjusting a parameter of the HVAC system. In some embodiments, the HVAC system may comprise such processing circuitry.

In some embodiments, an HVAC system of a vehicle is provided, comprising input/output (I/O) circuitry configured to receive a sensor signal that indicates whether a cabin of the vehicle is unoccupied, and processing circuitry configured to determine, based on the sensor signal, whether the cabin is unoccupied, and in response to determining that the cabin is unoccupied, adjust a parameter of the HVAC system.

In some embodiments, the processing circuitry is further configured to determine an ambient temperature in an environment of the vehicle, determine a setting for the parameter of the HVAC system based at least on the ambient temperature, and adjust the parameter of the HVAC system to the determined setting.

In some embodiments, the processing circuitry is further configured to determine an ambient temperature in an environment of the vehicle, determine a door of the cabin is left open, and determine a setting for the parameter of the HVAC system based at least on the ambient temperature and the door of the vehicle left open.

In some embodiments, the HVAC system comprises an air vent configured to provide conditioned air, and the processing circuitry is configured to adjust the parameter of the HVAC system by turning off the air vent and directing thermal energy to a vehicle seat of the vehicle occupant.

In some embodiments, the processing circuitry is configured to modify a temperature setpoint of the HVAC system and adjust the parameter of the HVAC system based at least on the modified temperature setpoint.

In some embodiments, the processing circuitry is configured to adjust the parameter of the HVAC system by reducing a power output of the HVAC system.

In some embodiments, the processing circuitry is further configured to determine an input specifying a preferred setting for the parameter of the HVAC system when the vehicle occupant has left the cabin (and/or when the cabin is unoccupied), and adjust the parameter of the HVAC system based on the input.

In some embodiments, the processing circuitry is configured to determine a location of the vehicle occupant has changed from the cabin to a location outside the vehicle, wherein determining the vehicle occupant has left the cabin (and/or determining the cabin is unoccupied) is based at least on the location of the vehicle occupant, and adjust the parameter of the HVAC system based on the location of the vehicle occupant.

In some embodiments, the processing circuitry is configured to determine a location of the vehicle occupant has changed from the cabin to a cargo space of the vehicle, wherein determining the vehicle occupant has left the cabin (and/or determining the cabin is unoccupied) is based at least on the location of the vehicle occupant, and adjust the parameter of the HVAC system based on the location of the vehicle occupant.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
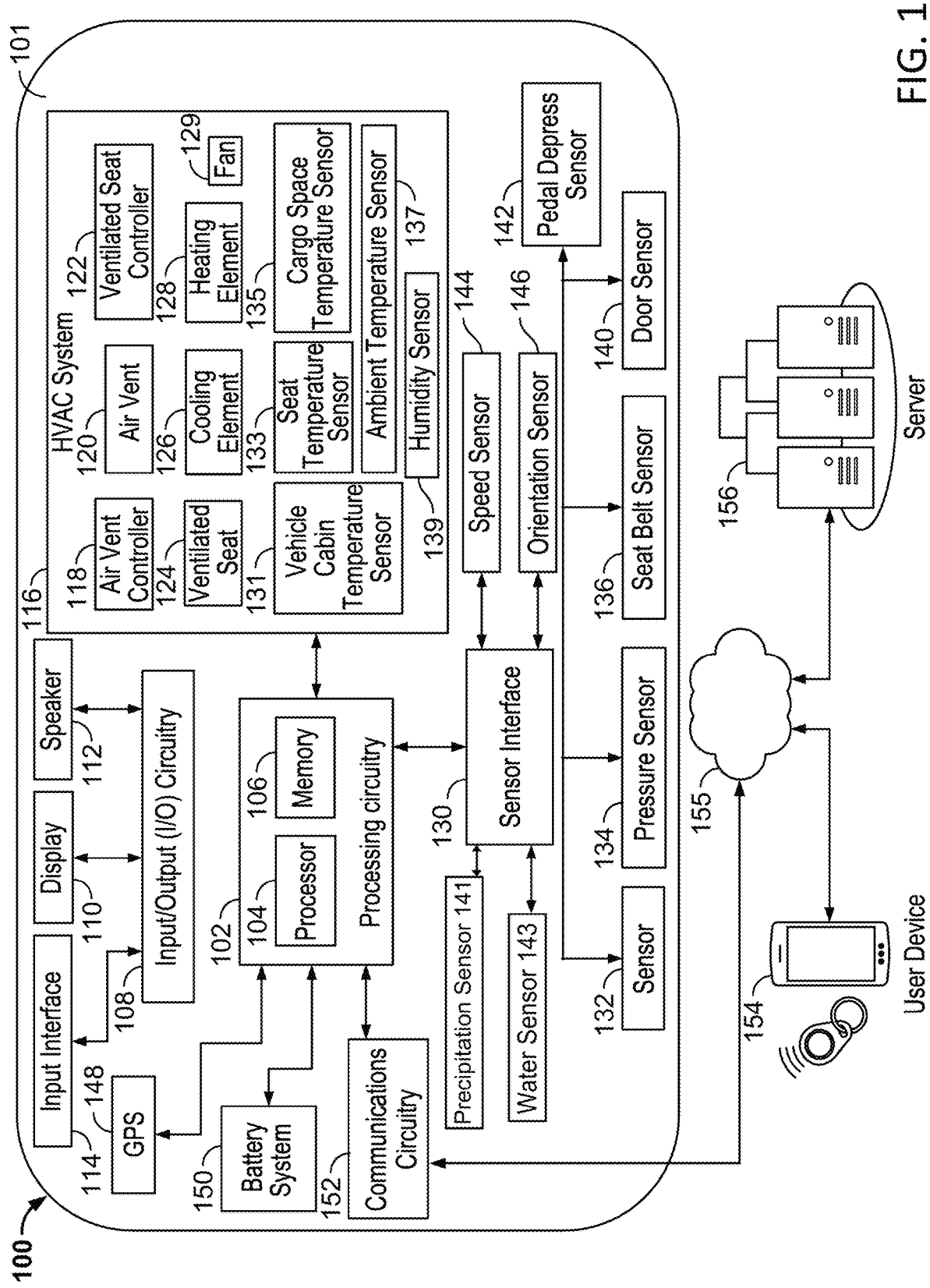
FIG. 1 shows a block diagram of an illustrative system for adjusting a parameter of an HVAC system, in accordance with some embodiments of the present disclosure.

FIG. 1 shows a block diagram of an illustrative system 100 for adjusting a parameter of an HVAC system, in accordance with some embodiments of the present disclosure. System 100 may comprise vehicle 101, one or more of user device 154 (e.g., a key fob; a mobile device, such as, for example, a smart phone or a tablet; or any other suitable computing device, such as, for example a laptop computer, a desktop computer; or any combination thereof) and cloud computing resources 156 (e.g., one or more remote servers, which may include and/or maintain and/or be in communication with one or more databases). Such elements of system 100 may be configured to communicate over any suitable wireless communication path. For example, user device 154 may be configured to communicate with vehicle 101 using a short-range radio communication technique, such as, for example, Bluetooth or near-field communication (NFC) and/or any other suitable technique, and/or vehicle 101 may communicate with user device 154 and server 156 over network 155, e.g., the Internet, a local area network, a wide area network, a satellite network, a cellular network, or any other suitable network, or any combination thereof. In some embodiments, user device 154 may be configured to implement a mobile application (e.g., provided by and/or associated with a manufacturer of vehicle 101) that allows a user to access a user profile and specify certain settings or preferences of the user profile, e.g., preferred HVAC settings, preferred thermal settings for a vehicle component (e.g., a ventilated seat or steering wheel, other any other suitable component to which thermal energy may be directed) or any other suitable settings, or any combination thereof.

Vehicle 101 may be a car (e.g., a delivery truck, a delivery van, a delivery car, a coupe, a sedan, a truck, an SUV, a bus, or any other suitable type of car, or any combination thereof), a motorcycle, an aircraft (e.g., a drone, or any other suitable type of aircraft), a watercraft (e.g., a boat or any other suitable type of watercraft), or any other suitable type of vehicle, or any combination thereof. In some embodiments, vehicle 101 may be configured to operate autonomously or semi-autonomously. Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Processing circuitry 102 may be communicatively connected to components of vehicle 101 via one or more wires, or via wireless connection. In some embodiments, the processor 104 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. Processing circuitry 102 may monitor sensor signals, generate control signals, execute computer readable instructions, receive inputs, perform any other suitable actions, or any combination thereof.

Memory 106 may comprise hardware elements for non-transitory storage of commands or instructions, that, when executed by processor 104, cause processor 104 to operate vehicle 101 in accordance with embodiments described above and below. Memory 106 may include any suitable storage device such as, for example, volatile memory, non-volatile memory, a removable storage device, a solid-state storage device, an optical device, a magnetic device, any other suitable component, or any combination thereof, for storing information.

Processing circuitry 102 may be communicatively connected to input interface 114 (e.g., a steering wheel, a touch screen display, buttons, knobs, a microphone or other audio capture device, or any other suitable input interface, or any combination thereof) via input/output (I/O) circuitry 108. In some embodiments, a driver or other occupant of vehicle 101 may be permitted to select certain settings in connection with the operation of vehicle 101 via input interface 114, e.g., thermal storage settings for a vehicle component, HVAC settings, or any other suitable settings, or any combination thereof. In some embodiments, a driver or other occupant of vehicle 101 may be permitted to provide inputs by way of input interface 114, e.g., via user selection of an icon on a touchscreen display on vehicle 101, via selection of a button or switch at a dashboard of vehicle 101, via voice command received by a microphone of vehicle 101, via tactile input, via user device 154, or via any other suitable input, or any combination thereof. In some embodiments, a vehicle occupant may be understood as a human (e.g., a driver or passenger of vehicle 101 capable of providing inputs via input interface 114), a computer or robot (e.g., in the case of vehicle 101 being autonomous or semi-autonomous), an animal (e.g., pets), or any other suitable vehicle occupant.

Processing circuitry 102 may be communicatively connected to display 110 and speaker 112 by way of I/O circuitry 108. Display 110 may be located at a dashboard of vehicle 101 and/or at a heads-up display at a windshield of vehicle 101, or at any other suitable location, or any combination thereof. Display 110 may comprise an LCD display, an OLED display, an LED display, or any other suitable type of display, or any combination thereof. Display 110 may be configured to display HVAC settings, thermal storage settings for a vehicle component, and/or selectable identifiers associated with user profiles of a particular user account or user account associated with vehicle 101, or any other suitable content, or any combination thereof. Speaker 112 may be located at any suitable location within vehicle 101, e.g., at a dashboard of vehicle 101, on an interior portion of the vehicle door, in a cargo potion of vehicle 101, or any combination thereof, and may be configured to provide audio output to a driver and/or occupant of vehicle 101.

Vehicle 101 may comprise HVAC system 116. Processing circuitry 102 may be communicatively connected to HVAC system 116. HVAC system 116 may comprise any of one or more of heating, ventilation, or air conditioning components, or any other suitable components, or any combination thereof, configured to maintain thermal comfort in vehicle 101 and/or control humidity of air in an interior of vehicle 101. In some embodiments, HVAC system 116 may comprise one or more of a variety of components (e.g., a compressor, a condenser, a fan, valving (e.g., controllable and/or fixed), a blower, an evaporator, a radiator, heat exchangers, a heater (e.g., a positive temperature coefficient (PCT) heater), a chiller, an expansion valve, a recirculation system, an air mixing portion, or any other suitable component, or any combination thereof. In some embodiments, one or more of such components of HVAC system 116 may be configured to process a working fluid (e.g., any suitable refrigerant, coolant, or other fluid) and provide conditioned air (e.g., having its temperature and/or humidity modified) to any suitable portion of vehicle 101 and/or ventilated seat 124. Additionally or alternatively, HVAC system 116 may comprise ventilation elements, e.g., use fans, blowers or ducts to circulate air and/or bring fresh air inside vehicle 101, where such air may or may not be conditioned, and/or may be used to reduce moisture of air within vehicle 101. In some embodiments, HVAC system 116 may employ any suitable sensor, e.g., current sensors (e.g., of a compressor motor) to measure an output power of HVAC system 116. In some circumstances, HVAC system 116 may be configured to provide heating and ventilation, without providing air conditioning; in some circumstances, HVAC system 116 may be configured to provide air conditioning and ventilation, without providing heating.

HVAC system 116 may be configured to provide cabin cooling (e.g., air conditioning), heating, defrosting, venting, or any suitable combination thereof. HVAC system 116 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. HVAC system 116 may comprise air vent controller 118, air vent 120, ventilated seat controller 122, ventilated seat 124, cooling element 126, heating element 128, fan 129, vehicle cabin temperature sensor 131, seat temperature sensor 133, cargo space temperature sensor 135, ambient temperature sensor 137, humidity sensor 139, and/or any other suitable components, or any combination thereof. Although only a single component for such elements is shown, HVAC system 116 may include any number of such components. In some embodiments, air vent controller 118 and/or ventilated seat controller 122 may be implemented in a similar manner as processing circuitry 102.

HVAC system 116 may comprise one or more air vents 120. Processing circuitry 102 may be communicatively connected (e.g., via air vent controller 118) to air vent 120. Air vent 120 may be configured to direct conditioned air from HVAC system 116 to different portions of vehicle 101 (e.g., a vehicle cabin, a vehicle seat, a vehicle cargo space, or any other suitable portions of vehicle 101, or any combination thereof). In some embodiments, air vent 120 may include fins which may be moved (e.g., rotated or translated) via at least one motor or actuator. In some embodiments, fins of the vent can be oriented to direct air from the vent into any suitable direction inside vehicle 101.

In some embodiments, air vent controller 118 and/or ventilated seat controller 122 and/or processing circuitry 102 may be configured to, in response to determining that a vehicle occupant has left a vehicle cabin of vehicle 101 (or based on determining that the vehicle cabin is unoccupied), adjust a parameter of HVAC system 116. For example, the adjusting of the parameter of HVAC system 116 may be based on modifying a temperature setpoint and/or airflow intensity being provided by a cooling system or heating system of vehicle 101 via air vent 120 (e.g., by controlling a valve of air vent 120 to be turned on or off or partially on, or using any other suitable technique). In some embodiments, modifying the temperature setpoint, airflow intensity or other parameter may be understood as increasing or decreasing a value or setting for such temperature setpoint, airflow intensity or other parameter. In some embodiments, such adjustment may be based on current ambient conditions in an environment of vehicle 101, e.g., inside and/or outside vehicle 101. In some embodiments, such adjustment may be based on a selection received from a user, e.g., via user device 154 and/or received via I/O circuitry 108 of vehicle 101, of a specific temperature value or other selection.

In some embodiments, the one or more retrieved parameters of HVAC system 116 for performing the adjustment may correspond to particular setpoints for one or more of temperature, flow rate, humidity, air flow direction, or any other suitable parameter, or any combination thereof. In some embodiments, air vent controller 118 and/or ventilated seat controller 122 and/or processing circuitry 102 may be configured to determine the current HVAC system parameters (e.g., current setpoints for one or more of temperature, flow rate, humidity, air flow direction, or any other suitable parameter, or any combination thereof). Air vent controller 118 and/or ventilated seat controller 122 and/or processing circuitry 102 may cause HVAC system 116 to modify or adjust such current HVAC system parameters based on the one or more retrieved parameters of the HVAC system. In some embodiments, the one or more retrieved parameters of HVAC system 116 may depend on current ambient conditions, inside and/or outside vehicle 101. In some embodiments, the one or more retrieved setpoints may correspond to a desired or target value of a parameter to be detected within vehicle 101, or a desired or target value of a parameter to be output by HVAC system 116, and such one or more retrieved setpoints may be selected based on current ambient conditions (e.g., humidity and/or temperature measurements within vehicle 101, and/or humidity and/or temperature measurements outside vehicle 101).

As an example, an evaporator of HVAC system 116 may be employed in conjunction with a blower to dry air and reduce humidity in a vehicle cabin, e.g., until a desired humidity setpoint, which may be specified for the current ambient conditions, is detected within vehicle 101 or is output by HVAC system 116 for a certain period of time. Additionally or alternatively, a heater, e.g., heating element 128, may be configured to provide hot air to a suitable portion of the vehicle (e.g., seat 124) at a particular temperature and/or flow rate, e.g., at which the user's clothing may be situated, in accordance with a temperature setpoint and/or a flow rate setpoint given the current ambient conditions, and/or a fan blower may be configured to blow air towards a specific portion of the vehicle and/or clothing or body part of the user. In some embodiments, a predetermined period of time during which the adjusting should be maintained (e.g., prior to the vehicle occupant's return or after the vehicle occupant's return) may be stored and referenced (e.g., at memory 106), where such period of time may be based on determined ambient conditions and/or other sensor inputs. In some embodiments, such one or more parameters of HVAC system 116 may be retrieved, and the adjustment of the current HVAC parameters may be performed, while the user is outside the vehicle, e.g., the adjusting may be performed automatically based on the location of the occupant and/or other suitable factors, or the user may instruct the adjusting to be performed while outside the vehicle, e.g., via a mobile device.

In some embodiments, the adjusting of the HVAC parameters within vehicle 101 may be performed for a predetermined period of time, the duration of which may depend on one or more factors. For example, processing circuitry 102 may reference a lookup table storing relationships between a duration of time and current ambient conditions, e.g., a higher humidity level being measured may indicate a longer period of time should be employed, such as to dry seat 124, as compared to when a lower humidity level is measured. In some embodiments, the predetermined period of time may correspond to a period of time required to cause a setpoint within vehicle 101 to reach a target value, or a period of time for which a setpoint of a parameter output by HVAC system 116 should be applied at a certain value. Additionally or alternatively, if a material (e.g., seat 124 or clothing of a user and/or any other suitable material) is determined to be of a particular wetness, the predetermined period of time may be indicated in the lookup table and may correspond to a period of time to dry the particular material having the determined wetness level. For example, a high wetness level may suggest that more time is needed for performing the adjustment. As another example, the user may be prompted to indicate when he or she wishes to end the adjusting of the parameters such as when he or she is satisfied with the extent of the drying.

In some embodiments, adjusting a parameter of HVAC system 116 based on determining that a vehicle occupant has left a vehicle cabin of vehicle 101 (or based on determining that the vehicle cabin is unoccupied) may comprise directing thermal energy towards particular portion(s) and/or certain components of vehicle 101, to maintain a comfortable environment, e.g., for when the vehicle occupant re-enters vehicle 101. For example, processing circuitry 102 may cause the HVAC system to direct thermal energy by using seat 124, a steering wheel of vehicle 101 (an example of input interface 114), or any other suitable component, or any combination thereof, of vehicle 101 to direct the thermal energy.

In some embodiments, vehicle 101 may receive input, e.g., via a single button push received via display 110, such as, for example, on an XMM screen of an HVAC tab, or a dashboard of vehicle 101, or at user device 154 (e.g., when the user is inside or outside the vehicle), a voice command received via input interface 114 (e.g., a microphone) or user device 154, or any other suitable input, or any combination thereof, regarding adjusting a parameter of vehicle 101 and/or indicating a particular portion of vehicle 101 for which thermal energy should be directed. For example, the user may decide to provide such input if the user is about to exit the vehicle to perform a delivery and anticipates being wet upon his or her return to the vehicle (e.g., due to current weather conditions such as ongoing precipitation being observed by the user), is not wearing waterproof clothing, or any other suitable motivation, or any combination thereof.

In some embodiments, HVAC system 116 may be caused by processing circuitry 102 or any other suitable controller 118 or 122 to automatically (e.g., regardless of whether user input is received) adjust a parameter of HVAC system 116 in response to determining that a vehicle occupant has left a vehicle cabin of vehicle 101 (or based on determining that the vehicle cabin is unoccupied). For example, such automatic adjustment may take into account a location of a user, determined based on signals received from any suitable sensor(s), to determine whether a user has left vehicle 101 and is currently outside a cabin of vehicle 101, e.g., after having been inside vehicle 101, or that a cabin of vehicle 101 is otherwise unoccupied. In some embodiments, processing circuitry 102 may determine which portion of vehicle 101 the vehicle occupant is located at, e.g., a cabin or a cargo portion of vehicle, which may impact the parameter retrieved for the adjusting of HVAC system 116.

In some embodiments, HVAC system 116 may, in conjunction with the determined location of the user, take into account determined ambient conditions of an environment of vehicle 101. For example, HVAC system 116 may determine that weather conditions indicate on-going or imminent precipitation and/or extreme weather (e.g., very cold temperatures, such as, for example, below a particular threshold), and/or based on receiving sensor signals indicating that a vehicle component and/or other object or material in vehicle 101 or occupant in vehicle 101 is wet. For example, HVAC system 116 may determine, based on sensor signals received from precipitation sensor 141, which may be positioned at a windshield of vehicle 101 or any other suitable location, that the current weather corresponds to rain, snow, sleet, hail, etc. In such a circumstance, it may be desirable to adjust HVAC parameters (e.g., while a vehicle occupant is outside vehicle 101, such as to dry an already wet seat or in anticipation of a wet seat upon the occupant's return) in preparation for the return of the vehicle occupant to vehicle 101 to maintain optimal thermal conditions. In some embodiments, precipitation sensor 141 may be a rain-light sensor or rain sensor. In some embodiments, precipitation sensor 141 may be an optical sensor, infrared sensor, an ultrasound sensor, or any other suitable sensor or any combination thereof. As an example, precipitation sensor 141 may measure an amount of light reflected from the windshield to precipitation sensor 141, where less light being reflected than a threshold, or a change in the amount of reflected light measured by precipitation sensor 141, may indicate that raindrops and/or other precipitation is present on the windshield, as the raindrops may divert the path of light from returning to the sensor. In some embodiments, parameter adjustment may be triggered at least in part based on determining that precipitation is currently heavy, e.g., based on readings of precipitation sensor 141.

For example, if processing circuitry 102 and/or HVAC system 116 receives an indication that precipitation sensor 141 has detected currently occurring precipitation (or in some cases, imminent or recent precipitation), processing circuitry 102 and/or HVAC system 116 may determine that a user was exposed to precipitation. For example, a user may be determined as having been exposed to precipitation if user is detected to currently be outside vehicle 101 and thus exposed to the precipitation. In some embodiments, images of the environment outside vehicle 101 may be captured and processed, e.g., to identify potential puddles near the vehicle or other conditions suggesting the user's clothing may become wet upon his or her return, such as, for example, after a delivery, or based on any other suitable factor, or any combination thereof, and parameter adjustment may be performed based at least in part on such processed images.

As another example, water sensor 143 may be included in or around particular portions of vehicle 101 and/or vehicle components, such as seat 124 (e.g., at a seat back 311 and/or seat bottom cushion 309) and/or at a floor in a vicinity of a seat, to determine whether water is present in or around seat 124 or in or around any other suitable particular portion of vehicle 101. The adjusting of HVAC parameters may be triggered at least in part based on if water is determined to be present (e.g., if any water is detected at all, or water is detected to be above a threshold amount) at the seat or other portion of vehicle 101. In some embodiments, water sensor 143 may detect the presence of water based on measuring a decreased resistance between two electrodes, e.g., based on the electrical conductivity of water, or water sensor 143 may be capacitance-based such that a change in capacitance may indicate the presence of water, or any other suitable water or wet sensor may be employed. Additionally or alternatively, vehicle 101 may determine, based on signals from ambient temperature sensor 137 and/or weather information received from server 156 and/or weather information received from user device 154, that an occupant is likely to be wet (e.g., based on forecasted or current precipitation, or due to hot temperatures and/or high humidity such that the user is likely to perspire while the user is out of the vehicle), upon his or her return to vehicle 101. In some embodiments, HVAC system 116 and/or processing circuitry 102 may cause a notification to be provided to a user indicating that adjustment of parameters has been automatically performed, and may provide an option to the user to revert to prior HVAC settings and/or indicate whether such adjustment should be automatically performed in future similar instances.

Ventilated seat 124 for vehicle 101 may be configured (e.g., via ventilated seat controller 122, which may be communicatively connected to processing circuitry 102) to efficiently maintain thermal conditions of vehicle 101, to provide thermal comfort, e.g., heating or cooling, to a vehicle occupant that is sitting or otherwise located at ventilated seat 124. In some embodiments, ventilated seat 124 may comprise a seat cushion assembly (e.g., a bottom cushion 309 and/or a seat back rest cushion 311 of FIG. 3) and an air duct configured to provide conditioned air, from HVAC system 116 to the seat cushion assembly. In some embodiments, ventilated seat 124 may comprise heating element 128, which may be configured to provide heating to an occupant of ventilated seat 124, e.g., by applying electric current through a wire or coil of heating element 128 to generate heat. In some embodiments, cooling may be provided to ventilated seat 124 via cooling element 126, which may utilize working fluids or refrigerant to provide such cooling. In some embodiments, ventilated seat 124 may comprise or be associated with seat temperature sensor 133, which may be configured to measure a temperature in one or more portions of ventilated seat 124. In some embodiments, one or more of fan 129, a blower, or a duct, or any other suitable equipment, or any combination thereof, may be disposed within ventilated seat 124 to heat or cool ventilated seat 124. For example, air may be configured to pass through small perforations or pores of seat 124, and/or modify a moisture or humidity level of the air. In some embodiments, one or more portions of HVAC system 116 may be connected to ventilated seat 124 via a duct, or any other suitable conduit, as discussed in more detail in commonly-owned application Ser. No. 17/390,710 to Feltham et al., the contents of which are hereby incorporated by reference herein in their entirety. For example, such aspects may (or may not) allow humidity associated with ventilated seat 124 to be adjusted.

In some embodiments, ventilated seat 124 may comprise components or layers, e.g., porous materials, seat heaters, air channels, and any other suitable components or layers, or any combination thereof. In some embodiments, during a no-sit condition (e.g., the user not being present in seat 124), a maximum flow rate possible may be applied (e.g., to dry a wet seat while the occupant is outside the vehicle), which may enable the seat to dry and/or cool quickly to facilitate removing residual sweat or rainwater through accelerated evaporation, e.g., an auto-dry function. The user may activate such mode prior to exiting vehicle 101 or such mode may be automatically entered upon processing circuitry 102 and/or HVAC system 116 detecting moisture and/or water on seat 124 via water sensor 143, and/or upon detecting moisture and/or water at any other suitable component of vehicle 101, and/or upon detecting that the user is outside or has returned to vehicle 101.

In some embodiments, the adjusting of the parameters, which may be triggered at least in part by determining that a vehicle occupant has left a vehicle cabin of vehicle 101 (or based on determining that the vehicle cabin is unoccupied), may be operable to direct thermal energy to seat back 311 and/or seat bottom cushion 309, of a driver seat, occupant seat or passenger seat of the vehicle. This may enable drying, and/or conditioning air in a vicinity of, seat 124, a jacket and/or shirt and/or torso of the occupant, and/or pants or shorts or a bathing suit of the occupant, upon his or her return to vehicle 101. In some embodiments, such aspects may enable drying any suitable material, e.g., towels, blankets, hats, or occupant (e.g., persons or pets) which the user may place in a desired portion of vehicle 101 (e.g., when the user leaves vehicle 101). In some embodiments, adjusting of the parameters may be automatically performed based on one or more sensor inputs, e.g., indicating that a particular portion of vehicle 101 is wet and/or detecting the presence and/or wetness of an object or material or person or animal at such particular portion of the vehicle 101.

In some embodiments, the adjusting of the parameter may comprise processing circuitry 102 causing (e.g., directly or via ventilated seat controller 122) ventilated seat 124 to begin storing more thermal energy than was being stored prior to determining to perform the adjusting. In some embodiments, ventilated seat 124 may not be storing thermal energy at all prior to processing circuitry 102 determining to perform the adjusting, or may be storing an amount of energy that is determined to be insufficient for the current conditions, and adjustment may be performed based on one or more of the retrieved parameters until at least a particular setpoint is met. In some embodiments, such adjustment may be based on a selection received from a user, e.g., via user device 154 and/or received via I/O circuitry 108 of vehicle 101, of a specific temperature value or setting associated with ventilated seat 124. Additionally or alternatively, the adjustment of the thermal energy to be directed to ventilated seat 124 may be performed automatically.

Vehicle cabin temperature sensor 131 may be configured to monitor a temperature of a cabin portion of vehicle 101, cargo space temperature sensor 135 may be configured to monitor a temperature of a cargo space portion of vehicle 101, and ambient temperature sensor 137 may be configured to monitor an ambient temperature of an environment outside vehicle 101 (and/or within vehicle 101). In some embodiments, temperatures sensors 131, 133, 135, 137 may comprise a thermocouple, thermistor, resistance temperature detector, or optical sensor, or any suitable combination thereof. In some embodiments, HVAC system 116 may comprise sensors configured to measure temperature of a component (e.g., a heat exchanger, a chiller, a compressor), a fluid (e.g., air, coolant, or refrigerant), or a combination thereof. In some embodiments, HVAC system 116 may comprise sensors configured to measure pressure or a difference in pressure of a fluid (e.g., air, coolant, or refrigerant). In some embodiments, HVAC system 116 may comprise sensors configured to measure a flow rate in air, coolant, or refrigerant (e.g., to determine a cooling or heating rate).

Humidity sensor 139 may be configured to determine a current humidity level within a cabin (e.g., driver zone or vehicle cabin 302 of FIG. 3) of vehicle 101 (and/or outside vehicle 101 and/or at cargo zone 306 of FIG. 3), and may correspond to any suitable sensor or device configured to measure an absolute humidity, the amount of water vapor in the air of vehicle 101 (or a specific portion of vehicle 101), and/or a relative humidity, the amount of water vapor or moisture in the air expressed as a fraction or percentage of a maximum humidity at a given temperature, and/or a specific humidity. In some embodiments, humidity sensor 139 may be capacitive-based, resistive-based, thermal-based, or may be of any other suitable type, or any combination thereof. In some embodiments, based on the value output by humidity sensor 139, HVAC parameters may be adjusted in accordance with parameters or setpoints (e.g., based on determining vehicle 101 is unoccupied or that the occupant has left a vehicle cabin of vehicle 101). For example, an evaporator and/or blower of HVAC system 116 may be used to dehumidify the air of a cabin of vehicle 101, based on the retrieved HVAC parameters, where such dehumidification may also cause cooling of the vehicle cabin or portions thereof. In some embodiments, one or more of such sensor signals may be used as a signal indicative of whether one or more vehicle occupants have left vehicle 101, or that vehicle 101 is otherwise unoccupied at a current time.

Processing circuitry 102 may be communicatively connected (e.g., by way of sensor interface 130) to sensor 132, pressure sensor 134, seat belt sensor 136, door sensor 140, pedal depress sensor 142, speed sensor 144, orientation sensor 146, precipitation sensor 141, water sensor 143 and/or any other suitable sensor, and/or any suitable combination thereof. Sensor 132 may comprise one or more image sensors (e.g., a CMOS or CCD) configured to capture an internal or external environment of vehicle 101. Pressure sensor 134 (e.g., piezo or strain-based transducers) may be an occupant detection sensor positioned at one or more vehicle seats (e.g., ventilated seat 124) and may be configured to sense whether a vehicle occupant is present in a vehicle seat. Seat belt sensor 136 may be configured to output a signal to processing circuitry 102 (e.g., via sensor interface 130) indicative of whether a seat belt of a vehicle occupant is engaged or buckled. Door sensor 140 may be configured to output a signal to processing circuitry 102 (e.g., via sensor interface 130) indicative of whether a door of vehicle 101 is open or closed, or partially open. Pedal depress sensor 142 may be configured to output a signal to processing circuitry 102 (e.g., via sensor interface 130) indicative of whether a brake pedal or accelerator pedal is depressed. Such sensor outputs may be utilized by processing circuitry 102 to determine whether a vehicle occupant is present in a vehicle cabin or in a vehicle cargo space, or any other suitable portion of vehicle 101, or any combination thereof. In some embodiments, a current vehicle state (e.g., park or in drive) may be utilized to infer a location of the vehicle occupant. In some embodiments, determining that one or more actions (e.g., putting the vehicle is park, taking off seat belt) have been performed may trigger a cargo door to be automatically opened (e.g., to enable the vehicle occupant to retrieve a package for delivery).

Orientation sensor 146 may be an inclinometer, an accelerometer, a tiltmeter, any other pitch sensor, or any combination thereof and may be configured to provide vehicle 101 orientation values (e.g., vehicle's pitch and/or vehicle's roll) to processing circuitry 102. Speed sensor 144 may be one of a speedometer, a GPS sensor, a rotary encoder, or the like, or any combination thereof, and may be configured to provide a reading of the vehicle's current speed to processing circuitry 102. Such sensor outputs may be used to determine whether vehicle 101 is being operated or is stopped.

Processing circuitry 102 may be communicatively connected to communications circuitry 152. Communications circuitry 152 may comprise any suitable hardware and/or software operable to send and receive wired and/or wireless signals between vehicle 101 and external devices such as, for example, network or user devices (e.g., user device 154, server 156, and/or a Wi-Fi access point and/or a satellite) and/or any other suitable computing devices. Communications circuitry 152 may include an antenna and other control circuitry (e.g., protocol converters, rate converters, signal converters), or any combination thereof.

Processing circuitry 102 may be communicatively connected to battery system 150, which may be configured to provide power to one or more of the components of vehicle 101 during operation. In some embodiments, vehicle 101 may be an electric vehicle or a hybrid electric vehicle, and/or may be configured to be an autonomous or semi-autonomous vehicle. Processing circuitry 102 may be communicatively connected to GPS system 148 or other positioning device of vehicle 101, where the driver or operator may interact with GPS system 148 via input interface 114. GPS system 148 may be in communication with (e.g., via communications circuitry 152) one or more satellites and/or servers remote from vehicle 101 to ascertain a location of vehicle 101 and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with vehicle 101 (e.g., a location of a home of the user stored in memory 106) or any other suitable form, or any combination thereof.

It should be appreciated that FIG. 1 only shows some of the components of vehicle 101, and it will be understood that vehicle 101 also includes other elements commonly found in vehicles (e.g., electric vehicles or any other suitable vehicle), e.g., a motor, brakes, wheels, wheel controls, turn signals, windows, doors, etc.

User device 154 may be, for example, a smartphone, tablet or any suitable personal computing device operable to communicate with vehicle 101 and server 156, via wireless network or wired connection (e.g., via a USB connection or other data cable). In some embodiments, user device 154 may be a key fob comprising a number of buttons (e.g., two, three, four, or more than four buttons) that respectively correspond to a function or command. Such key fob may include a battery to provide electrical power, an antenna for transmitting and receiving signals, and processing circuitry to convert user selections (e.g., presses of a button) to an electrical signal which may then be converted to a wireless signal (e.g., via the antenna). In some embodiments, user device 154 may comprise a proximity sensor associated with, e.g., an RFID tag, or other positioning sensor, which may enable processing circuitry to ascertain a location of a vehicle occupant associated with user device 154.

Server 156 may comprise a plurality of servers configured to remotely provide cloud computing resources (e.g., storage, processing, software applications, etc.) to other components of system 100, e.g., user device 154, vehicle 101, and/or any other suitable component. Server 156 may be configured to maintain one or more databases. In some embodiments, server 156 may be associated with a manufacturer or purchaser of vehicle 101, and may be configured to store (e.g., a cloud-based storage system or a database associated with server 156) information related to each vehicle sold by the manufacturer and related to an owner of each vehicle, e.g., login credentials associated with a user account and/or user profile of the vehicle owner with the manufacturer. In some embodiments, server 156 may comprise a collection of servers, and processing circuitry of server 156 can be distributed across a number of servers.

Figure 2:
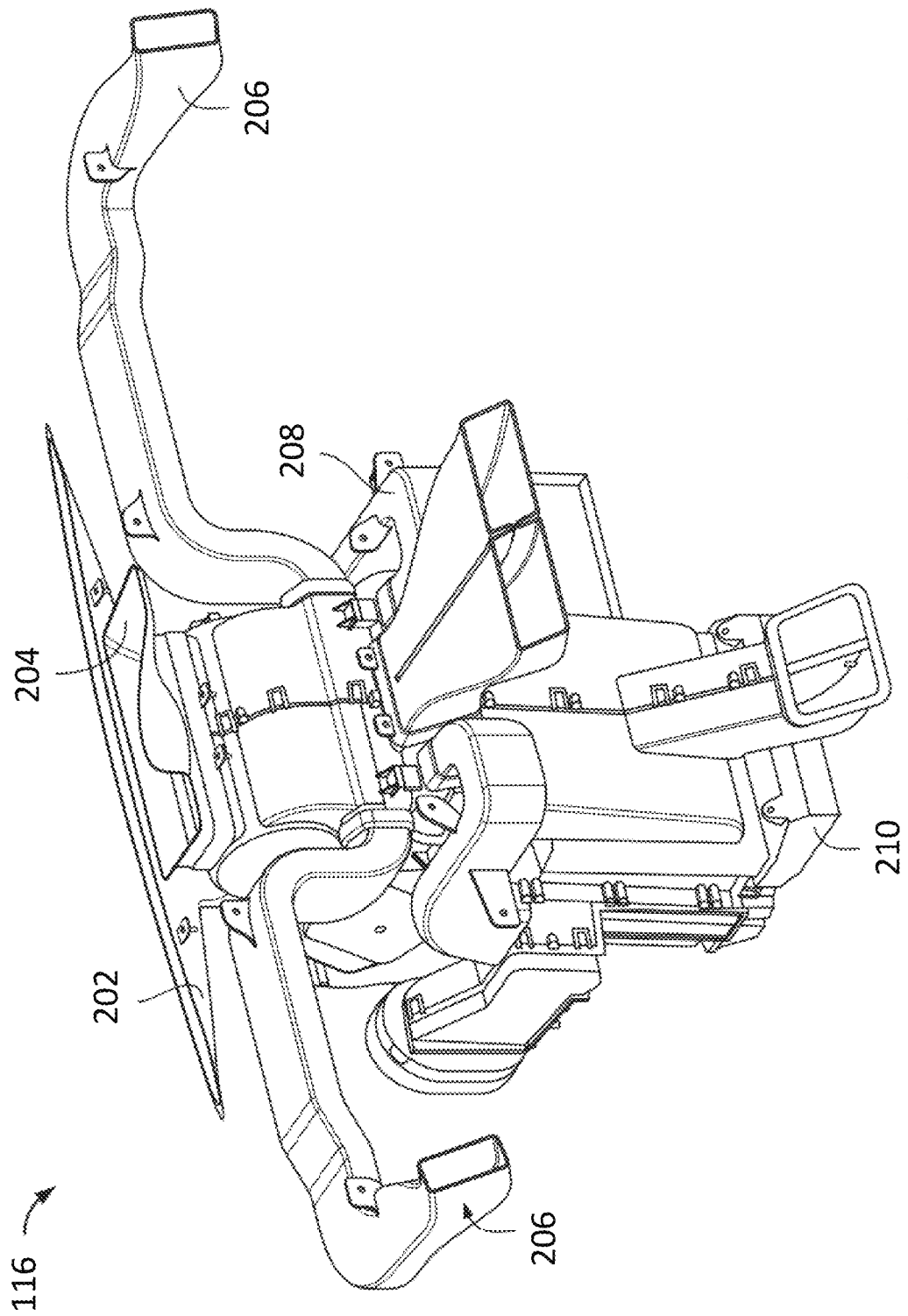
FIG. 2 shows an illustrative HVAC system of a vehicle, in accordance with some embodiments of the present disclosure.

FIG. 2 shows an illustrative HVAC system 116 of a vehicle, in accordance with some embodiments of the present disclosure. In some embodiments, HVAC system 116 may include assembly 210 for driving air to one or more other ducts (e.g., by operation of a compressor, a pump, a fan, or a vacuum, or any other suitable component, or any combination thereof). In some embodiments, HVAC system 116 may comprise several different vent ducts 202-208 for respective air vents 120. In some embodiments, HVAC system 116 may include face ducts 206, foot ducts 208, ambient air duct 204, and windshield defrost duct 202. In some embodiments, processing circuitry 102 of vehicle 101, and/or air vent controller 118, may control airflow from each of the ducts 202-208 using a respective valve for each duct 202-208. For example, processing circuitry 102 of vehicle 101, and/or air vent controller 118, may cause a valve to be completely closed to stop all air flow, or partially open or close a valve to control the rate of the airflow. In some embodiments, processing circuitry 102 of vehicle 101, and/or air vent controller 118, may control airflow from each of the ducts using a respective blower motor or fan for each duct. It should be appreciated that FIG. 2 is illustrative and that additional ducts maybe be included at any suitable portion of vehicle 101, e.g., a duct connected to a seat and/or a duct connected to a storage compartment, etc.

Figure 3:
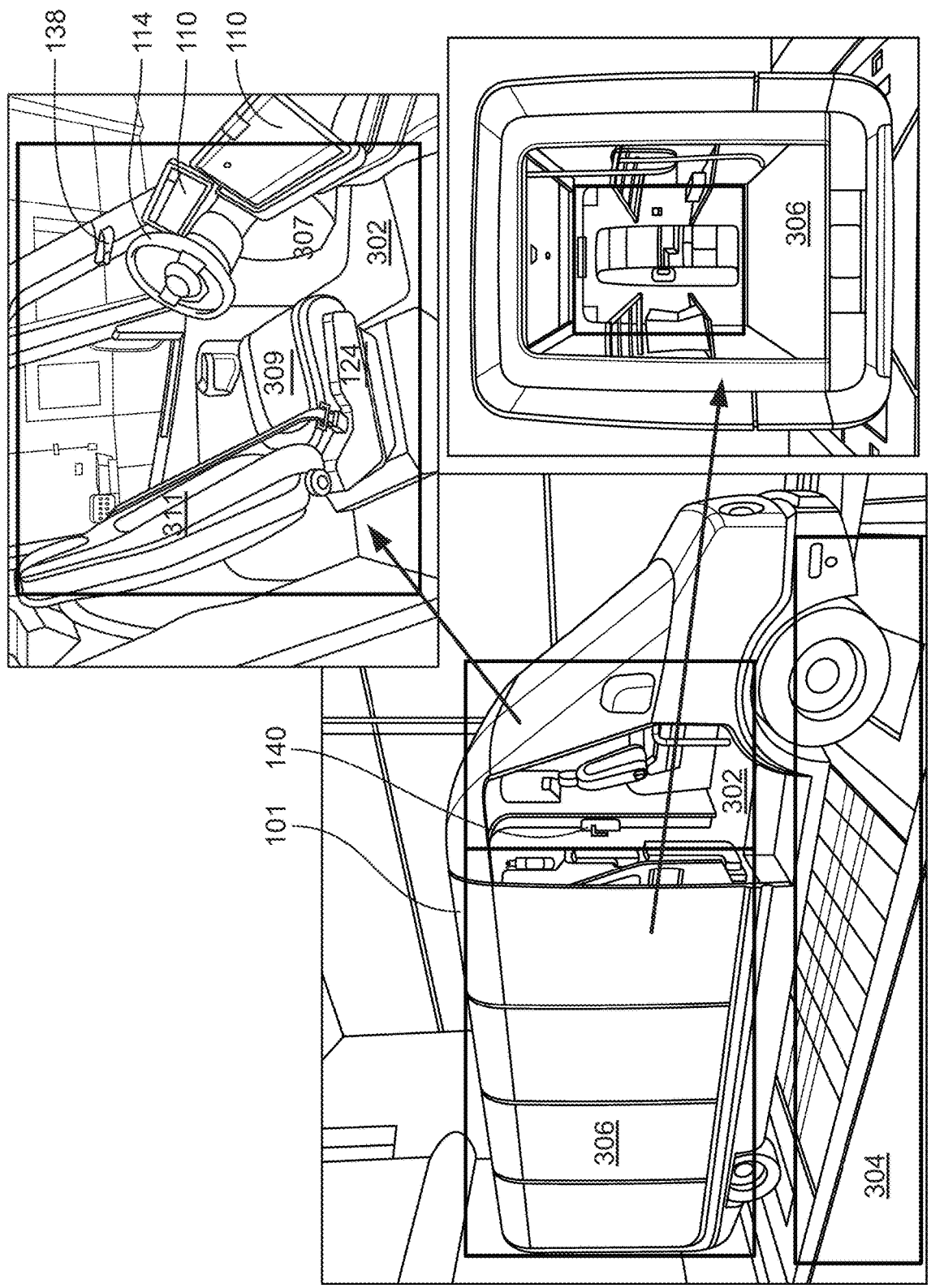
FIG. 3 shows illustrative zones of a vehicle, in accordance with some embodiments of the present disclosure.

FIG. 3 shows illustrative zones of a vehicle, in accordance with some embodiments of the present disclosure. As shown in FIG. 3, vehicle 101 may be a delivery vehicle comprising driver or operator zone or vehicle cabin 302 and cargo or loading zone 306. Vehicle cabin 302 may comprise ventilated seat 124 at which the vehicle occupant may sit and operate vehicle 101, input interface 114 (e.g., a steering wheel) and display 110, which may present information (e.g., current HVAC settings or HVAC settings to be applied in the event the occupant is determined to exit vehicle cabin 302 or vehicle cabin 302 is otherwise unoccupied) to the operator and receive commands from the operator. In some embodiments, vehicle cabin 302 may comprise HVAC components to provide conditioned and/or ventilated air to vehicle occupants to one or more of various portions of vehicle cabin 302. In some embodiments, vehicle cabin 302 may comprise a camera, e.g., sensor 132, and any other suitable sensors (e.g., pressure sensor 134, seat belt sensor 136, door sensor 140), or any combination thereof, which may be configured to monitor actions of the user and a location of the user within vehicle 101 or outside vehicle 101.

Cargo zone or loading zone 306 may correspond to a portion of vehicle 101 at which packages or products to be delivered are stored, e.g., a primary loading zone behind the cargo door or bulkhead (e.g., controlled via a motor). In some embodiments, cargo zone 306 may comprise HVAC components to provide conditioned and/or ventilated air to vehicle occupants. In some embodiments, vehicle cabin 302 may comprise sensor 132, and any other suitable sensors (e.g., door sensor 140 on a bulkhead door) to determine whether a vehicle occupant is present in cargo zone 306. For example, if a bulkhead door separating vehicle cabin 302 from cargo zone 306 is open, processing circuitry 102 may determine that the vehicle occupant's location is in cargo zone 306, e.g., to sort through packages to be delivered during his or her delivery shift. In some embodiments, vehicle 101 includes a selectable option (e.g., a hazard button or hazard switch) which upon being selected may cause the bulkhead door to be opened and/or which may indicate a delivery is occurring at environment 304 outside of vehicle 101 (or that vehicle 101 is otherwise unoccupied). In some embodiments, when the operator leaves the vehicle (e.g., detected based on a signal received, or an absence of a signal being received, from user device 154), the cargo door may close and lock, indicating the operator has left vehicle 101 (or that vehicle 101 is otherwise unoccupied).

In some embodiments, upon determining the vehicle occupant has left vehicle cabin 302 and is presently located in cargo zone 306, processing circuitry 102 may enable adjusting of parameters in cargo zone 306 and/or in vehicle cabin 302. In some embodiments, in such a circumstance, adjusting of vehicle cabin 302 may comprise less modification (e.g., increase or decrease) of HVAC parameters when the vehicle occupant is determined to be in cargo zone 306 relative to modification of HVAC parameters in vehicle cabin 302 when the vehicle occupant is determined to be in environment 304. For example, if the vehicle occupant is outside vehicle 101 in environment 304 which may be cold or otherwise inclement weather, it may be desirable to increase temperature and/or airflow and/or other parameters to heat up one or more portions of vehicle cabin 302 for when the vehicle occupant returns. On the other hand, cargo zone 306 may be less cold and shield the occupant from the inclement weather to some extent, and thus modification of HVAC parameters in vehicle cabin 302 may be less beneficial to the occupant returning to vehicle cabin 302 from cargo zone 306.

Figure 4:
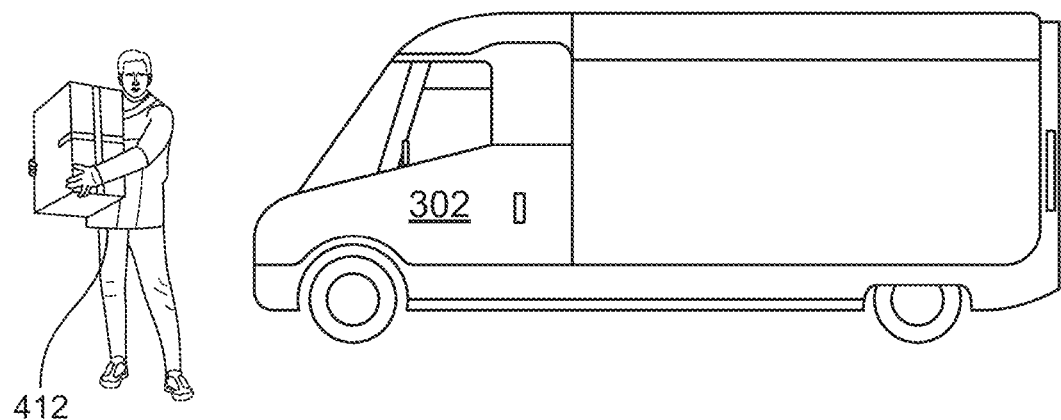
FIG. 4 shows an illustrative scenario in which a vehicle occupant has left the vehicle cabin (or the vehicle cabin is otherwise unoccupied), in accordance with some embodiments of the present disclosure.
Figure 4:
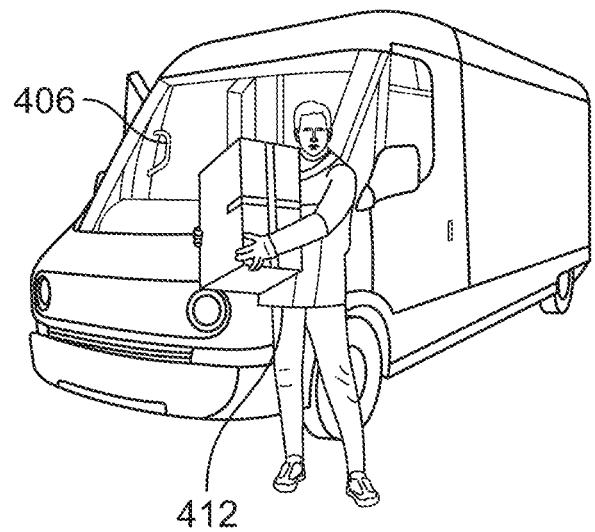
Figure 4:
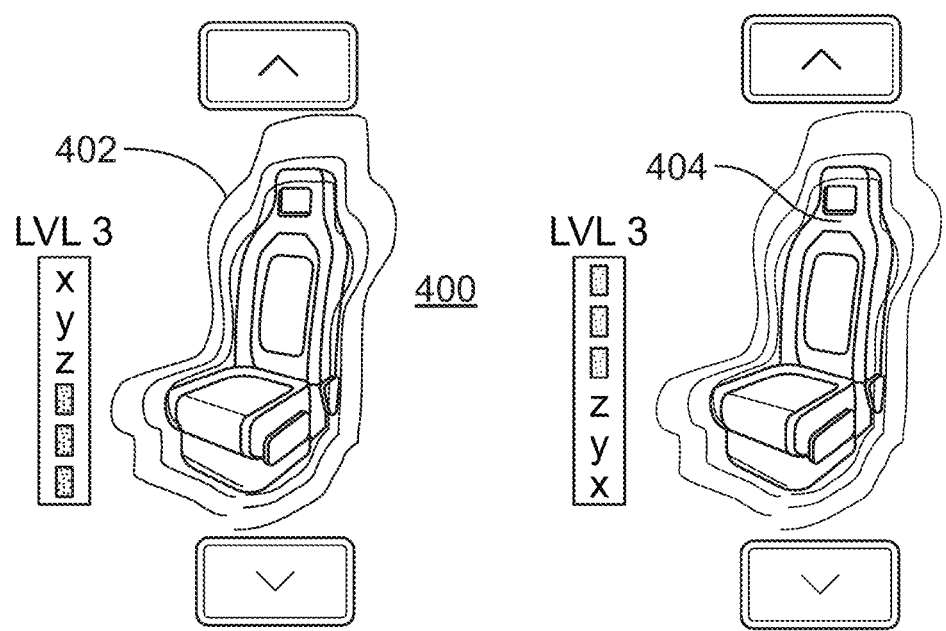

FIG. 4 shows an illustrative scenario in which a vehicle occupant has left the vehicle cabin (or the vehicle cabin is otherwise unoccupied), in accordance with some embodiments of the present disclosure. As shown in FIG. 4, vehicle occupant 412 is outside vehicle cabin 302, e.g., to deliver a package to a customer at a residential or commercial location, and vehicle cabin 302 is unoccupied. In some embodiments, vehicle occupant 412 may leave vehicle 101 while vehicle 101 is in operation, e.g., in park and with HVAC system 116 of vehicle 101 having been left on, while he or she delivers the package. Processing circuitry 102 of vehicle 101 may determine that vehicle occupant 412 has left vehicle cabin 302, and/or that HVAC system 116 remains in operation, and/or that vehicle door 406 has been left open, based on signals received from one or more sensors described in connection with FIG. 1 and FIG. 3.

For example, a signal output by pressure sensor 134 may indicate that vehicle occupant 412 has left vehicle cabin 302, and/or door sensor 140 may indicate that door 406 has been left open. In some embodiments, processing circuitry 102 of vehicle 101 may communicate with GPS 148, or user device 154 or server 156, or any other suitable device, or any combination thereof, to determine that vehicle occupant 412 has stopped to perform a delivery. In such circumstances, it may be desirable, to ensure maximum energy efficiency, that thermal conditioning of vehicle 101 is dynamic, e.g., to "follow" the position or location of the operator in the sense that the operational mode, output, and/or output location associated with HVAC 116 should change relative to where the user is located. For example, if processing circuitry 102 determines that operator is outside on a delivery, and door 406 was left open, it may be inefficient to keep HVAC system 116 in a cabin air conditioning mode since the conditioned air may simply be blown out of the open door to exchange energy with the environment, and it may be desirable for HVAC system 116 to be adjusted based at least in part on taking these circumstances into account.

Processing circuitry 102 of vehicle 101 may, in response to determining that vehicle occupant 412 has left vehicle cabin 302 (or that vehicle cabin 302 is otherwise unoccupied), determine that HVAC system 116 of vehicle 101 should be adjusted. For example, HVAC system 116 of vehicle 101 may have received, prior to vehicle occupant 412 exiting vehicle 1010, an indication to set a temperature of vehicle cabin 302 to a particular value, and/or an indication 402 to heat or cool ventilated seat 124 to a particular setting. Additionally or alternatively, HVAC system 116 of vehicle 101 may have automatically set vehicle cabin 302 and/or ventilated seat 124 to respective temperatures and/or settings based on determining that vehicle occupant 412 has left vehicle cabin 302 (or that vehicle cabin 302 is otherwise unoccupied). In some embodiments, options 402 and 404 may provide any suitable number of heating or cooling levels for selection for setting parameters for ventilated seat 124.

In response to determining that vehicle occupant 412 has left vehicle cabin 302 (or that vehicle cabin 302 is otherwise unoccupied), processing circuitry 102 may dynamically adapt the parameter of HVAC system 116 (e.g., a temperature value or other setting, such as, for example, to conserve energy since vehicle occupant 412 is no longer in vehicle cabin 302). Such adjustment may be based on a desired temperature setpoint or other HVAC setting specified by the user, or automatic adjustment of one or more HVAC parameters may be performed based on a location of vehicle occupant 412 and/or ambient conditions of an environment of vehicle 101. For example, processing circuitry 102 may cause one or more air vents 120 of HVAC system 116 to be turned off, or reduce an output power level for one or more air vents 120 relative to when vehicle occupant 412 exited vehicle 101 (e.g., to modify a heat setting to decrease a temperature setpoint of HVAC system 116). Alternatively, processing circuitry 102 may cause one or more air vents 120 of HVAC system 116 to be turned on, or increase an output power level for one or more air vents 120 relative to when vehicle occupant 412 exited vehicle 101 (e.g., to modify an air conditioning setting for vehicle cabin 302 to increase a temperature setpoint of HVAC system 116). In some embodiments, such adjustment may continue to be performed until processing circuitry 102 determines vehicle occupant 412 has returned to vehicle 101, or for a predetermined period of time after vehicle occupant 412 has returned to vehicle 101. In some embodiments, in response to turning off one or more air vents 120 of HVAC system 116, or reducing an output power level of air being provided via the one or more air vents 120, thermal energy may be directed to ventilated seat 124 (and/or a steering wheel or other suitable vehicle portion) for storage therein, to maintain or improve thermal conditions in vehicle 101 and provide thermal comfort to vehicle occupant 412 upon his or her return. In some embodiments, processing circuitry 102 may cause adjust one or more parameters of HVAC system (e.g., a temperature setpoint of vehicle cabin 302 or a setting for heating or cooling ventilated seat 124, or any other suitable parameter, or any combination thereof) based on a specified user preference previously set by the user, for a situation when the user leaves vehicle cabin 302. In some embodiments, user input specifying one or more of an in-vehicle driving setpoint, a cargo space setpoint, and a while delivery setpoint (e.g., when the occupant is detected to be in environment 304) may be received from vehicle occupant 412.

In some embodiments, processing circuitry 102 of vehicle 101 may determine an ambient temperature in an environment surrounding vehicle 101, based on an output received from ambient temperature sensor 137 or otherwise received via network 155 or via another device, e.g., user device 154 or server 156, or any other suitable device or combination of devices. In some embodiments, processing circuitry 102 may perform the adjustment of the parameter of HVAC system 116 based on the determined ambient temperature and current temperature or setting of HVAC system 116 within vehicle cabin 302 (e.g., determined based on an output signal of sensor 131) and/or a current temperature or setting of ventilated seat 124 (e.g., determined based on an output signal of sensor 133).

For example, processing circuitry 102 or HVAC system 116 may determine a suitable target temperature or setting for vehicle cabin 302 (or a portion thereof, such as a portion corresponding to where the vehicle occupant's feet are positioned while operating vehicle 101, or any other suitable portion, or any combination thereof) and/or a suitable target temperature or setting for ventilated seat 124, based on the ambient temperature and current characteristics of HVAC system 116. Processing circuitry 102 may adjust HVAC system 116 by causing HVAC system 116 to conform to the determined target temperature(s) or setting(s), e.g., adjusting an open or closed state of one or more air vents 120 and/or a cooling or heating state of ventilated seat 124. In some embodiments, adjusting the one or more parameters of HVAC system 116 may comprise switching between providing thermal energy to ventilated seat 124 versus a portion of vehicle cabin 302 at which occupant 412 keeps his or her feet (e.g., a region 307 of vehicle 101 that is in front of seat 124 and below a top of a seat cushion of seat 124) and/or a portion of vehicle cabin 302 at which occupant 412 keeps his or her face, his or her chest (e.g., in front of seat portion 311) or any other suitable portion of vehicle cabin 302. Such options may provide any suitable number of levels, e.g., fan levels or air vent levels.

In some embodiments, processing circuitry 102 may perform the adjustment based on determining the detected ambient temperature or other detected ambient condition is below a certain value or above a certain value, or is within a certain range. For example, if processing circuitry 102 determines the ambient temperature corresponds to a very hot temperature, HVAC system 116 may be maintained or only slightly reduced from a relatively high air conditioning level and/or relatively high ventilated seat cooling level within vehicle 101. On the other hand, if processing circuitry 102 determines the ambient temperature corresponds to a moderate temperature, processing circuitry 102 may determine that thermal comfort of vehicle 101 can be maintained even if HVAC system 116 is turned off, or HVAC system 116 may be modified to reduce the output power of, or de-rate, HVAC system 116 with respect to vehicle cabin 302 while still maintaining thermal comfort of vehicle 101 for the vehicle occupant, thereby conserving energy. In some embodiments, one or more components of HVAC system 116 may be modified based on particular slew rates for different ambient temperatures.

In some embodiments, one or more of heating, cooling and/or airflow may be boosted upon determining occupant 412 has returned to vehicle cabin 302, to help occupant 412 return to thermo-equilibrium quickly. In some embodiments, instead of bulk conditioning the entire cabin to a uniform temperature (hot or cold), processing circuitry 102 may cause heat flux to be locally directed to occupant 412. In some embodiments, slewing or lowering of the conditioning or ventilation, or any other HVAC operation, may be performed based on a control signal received from processing circuitry 102, while occupant 412 is out of vehicle cabin 302, to reduce overall energy usage.

In some embodiments, processing circuitry 102 and/or HVAC system 116 may reference a table stored in memory 106 (or memory of server 156, or any other suitable memory or any combination thereof) in determining whether to adjust, and/or how to adjust, one or more parameters of HVAC system 116 when vehicle occupant 412 is determined to have left vehicle cabin 302. For example, Table 1 shown below may be referenced by processing circuitry 102. As shown in Table 1, any suitable number of factors may be taken into account in determining whether and how to adjust parameters of HVAC system 116, e.g., solar irradiance on vehicle 101, ambient temperature, blower power (e.g., how much conditioned or unconditioned air to blow), heater temperature, evaporation setpoint (e.g., how much heating or cooling should be provided), target temperature, and an indication of whether HVAC should stay on, and any other suitable factor, or any combination thereof. For example, processing circuitry 102 may access Table 1 shown below and perform a lookup using the determined values for one or more of such factors with respect to a current scenario in which vehicle occupant 412 exited vehicle 101, in order to identify one or more actions to be taken (or whether such actions should be taken) with respect to HVAC system 116.

parameter, and may be correlated with a vehicle cabin temperature. In some embodiments, measurements of ventilated seat 124, a foot region 307 of vehicle cabin 302, and/or an air vent region of cabin 302 may be taken into consideration when performing the adjusting of an HVAC parameter, and/or a temperature at any other suitable portion of vehicle 101 may be taken into consideration, or any combination thereof.

In some embodiments, processing circuitry 102 and/or HVAC system 116 may take into account whether vehicle door 406 (or any other suitable door or window or other component, or any combination thereof) has been left open when vehicle occupant 412 exits vehicle cabin 302. For example, vehicle door 406 may be relatively heavy, and thus many drivers or operators of vehicle 101 may leave door 406 open when performing a relatively quick delivery of a package (e.g., it may strain the driver or operator's arms to constantly close the door after a large number of deliveries). In such a circumstance, processing circuitry 102 may pull energy into ventilated seat 124, as opposed to blowing or directing air into vehicle cabin 302 which may simply exit via the open door, and such technique may enable a large surface area of a body of occupant 412 to come in contact with hot or cold thermal energy (e.g., set based on the ambient temperature) upon sitting down again, thereby providing an efficient thermal energy transfer mechanism.

In some embodiments, certain portions of HVAC system, e.g., air vent 120 providing conditioned air, or any other suitable portion, may be turned off upon determining door 406 has been left open during a delivery. In some embodiments, in addition to taking into account whether door 406 has been left open, processing circuitry 102 may take into

TABLE 1

| Out-of-Cabin Deliveries | Ambient Temp | Blower Power | Heater Temp | Evaporation Setpoint | Target Temperature | HVAC stay on? |
|---|---|---|---|---|---|---|
| Low solar irradiance | Very Low | High | High | N/A | Very High | Yes, keep full heating on |
| Low solar irradiance | Low | High | High | N/A | High | Yes, keep full heating on |
| Moderate solar irradiance | Moderate | Low | Moderate | N/A | N/A | Conserve power, slew heater and blower to zero |
| High solar irradiance | Moderate | Moderate | N/A | High | Moderate | Keep cooling on. Slew to min. over time |
| High solar irradiance | High | High | N/A | Moderate | Very Low | Yes, keep full cooling on |
| Low solar irradiance | Very High | High | N/A | Low | Low | Yes, keep full cooling on |

In some embodiments, Table 1 may be utilized when processing circuitry 102 determines vehicle 101 is in a repeated deliveries mode (e.g., by referencing a delivery schedule, provided via server 156 or user device 154 or any other suitable source, or any combination thereof). In some embodiments, HVAC system 116 adjustments may be fully calibrated across the ambient temperature range to adapt to a dynamic environment. In some embodiments, processing circuitry 102 may be configured to keep a particular HVAC element on (e.g., to keep a blower spinning, or any other suitable component, or any combination thereof) to avoid start-up delay when occupant 412 returns to vehicle 101, e.g., if HVAC is on, the blower may be kept on. In some embodiments, a temperature of a breath of occupant 412 (e.g., measured by a thermocouple) may be taken into consideration when performing the adjusting of an HVAC account an ambient temperature or other ambient conditions. For example, if the ambient temperature is moderate, the door being left open may have a negligible impact on the operator's thermal comfort upon returning to vehicle 101 (e.g., occupant 412 may be comfortable naturally with based on his or her metabolic rate and clothing), and thus no or minimal adjustment to HVAC system 116 may be performed. On the other hand, if the ambient temperature is very hot or very cold, processing circuitry 102 may determine that it would be inefficient to leave HVAC system 116 operating in its current state.

In some embodiments, in determining whether to adjust, and/or how to adjust, one or more parameters of HVAC system 116 when vehicle occupant 412 is determined to have left vehicle cabin 302, processing circuitry 102 and/or HVAC system 116 may reference a table that is specific to an open door state or closed door state. In some embodiments, HVAC system 116 may determine which types of clothing a driver is wearing (e.g., a heavy coat or a t-shirt, or any other suitable clothing), such as based on input received from the driver or based on processing images of the driver captured by a camera, and may take into account such clothing when adjusting a parameter of HVAC system 116. For example, an amount of thermal energy directed to ventilated seat 124 may be less when the driver is wearing heavy clothing as opposed to if the driver is lightly dressed.

In some embodiments, HVAC system 116 may compensate for different conditions while driving, in an effort to maximize thermal comfort and minimize energy usage. For example, many delivery drivers may leave door 406, or another door or window or other suitable component, or any combination thereof, open while driving to a next delivery location. In such a circumstance, processing circuitry 102 may cause HVAC system 116 to, e.g., ramp down a blower if the vehicle exceeds a certain speed, or determine that less cooling should be provided due to an open door. In some embodiments, processing circuitry 102 may reference a first table (specific to when a driver is in a cabin with the door closed) or a second table (specific to when a driver is in the cabin with the door open), based on indications received from one or more sensors of the driver's location and whether one or more doors are open or closed. Such tables may be in a similar format to Table 1, and may correspond to a repeated deliveries mode.

In some embodiments, the HVAC system 116 may be adjusted based on an in-cabin long drive mode, e.g., when the delivery driver is determined to be driving on a relatively long continuous drive (e.g., on a highway), such as, for example, after a delivery shift has ended. Such in-cabin long drive mode may reference a table specific to such a mode, to maximize thermal comfort of vehicle occupant 412 while optimizing efficiency of HVAC system 116. In some embodiments, processing circuitry 102 may be configured to switch between the various modes, e.g., out of cabin deliveries, in cabin deliveries (door closed), in cabin deliveries (door open), long drive mode, or any other suitable modes, or any combination thereof, based on the location of vehicle occupant 412 frequently changing throughout a driving session (e.g., delivery shift, or other suitable driving session).

Figure 5:
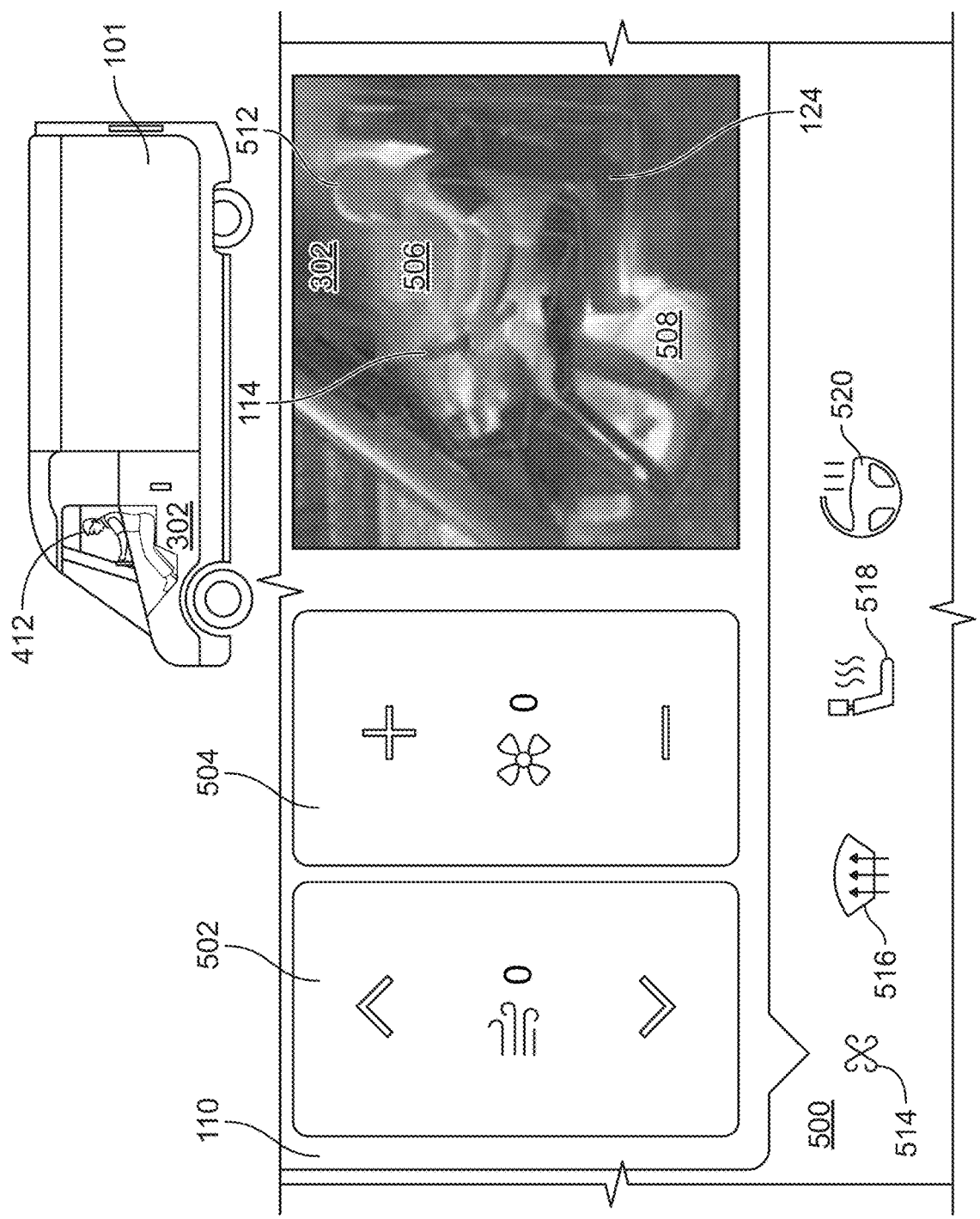
FIG. 5 shows an illustrative portion of a vehicle, in accordance with some embodiments of the present disclosure.

FIG. 5 shows an illustrative portion of a vehicle, in accordance with some embodiments of the present disclosure. As shown in FIG. 5, vehicle occupant 412 is present in ventilated seat 124. Processing circuitry 102 of vehicle 101 may determine that vehicle occupant 412 is present in vehicle cabin 302 based on signals received from one or more sensors, e.g., one or more of the sensors described in FIG. 1 or any other suitable sensors, or any suitable combination thereof. Processing circuitry 102 may determine that vehicle occupant 412 has returned to vehicle cabin 302 after having left vehicle cabin 302, e.g., in the example of FIG. 4.

Upon determining that vehicle occupant 412 has returned to vehicle cabin 302, may adjust one or more parameters of HVAC system 116. For example, air vents or other HVAC components associated with portion 508 of vehicle 101, corresponding to a location at which the feet of vehicle occupant 412 are positioned, or portion 506, corresponding to a location at which the face of vehicle occupant 412 is positioned, may have been turned off or decreased in output power to conserve energy while vehicle occupant 412 was outside vehicle 101, and such portions of HVAC system 116 may be brought back to normal levels to provide thermal comfort to occupant 412. In some embodiments, heating or cooling provided by ventilated seat 124 may have been increased when occupant 412 was outside vehicle 101, and may be decreased when occupant 412 returns to vehicle 101, e.g., to avoid ventilated seat 124 becoming too cold or too hot. In some embodiments, heating or cooling of input interface 114 (e.g., steering wheel) may be increased (e.g., depending on ambient temperature) while occupant 412 is outside of the vehicle, to provide thermal energy to the hands of occupant 412 when he or she returns to vehicle 101. In some embodiments, historical data of previous selections by the user or by other users may be used to adjust the one or more parameters of HVAC system 116 and/or provide recommendations to the user.

As shown in FIG. 5, display 110 of vehicle 101 may provide selectable options 502 and 504, associated with icon 514, to set temperature setpoints of HVAC settings in vehicle 101. Icon 516 may correspond to a defrost operation, icon 518 may correspond to heating or cooling ventilated seat 124, and option 520 may correspond to heating or cooling input interface 114 (e.g., steering wheel). Such options may permit a user to select heating and/or cooling settings, airflow settings, and mode of operation (face, foot, seat, or any other suitable portion, or any combination thereof). In some embodiments, HVAC system 116 may have been turned off when occupant 412 left vehicle cabin 302, but processing circuitry 102 may determine that one or more portions of HVAC system 116 should be turned on while occupant 412 is outside vehicle 101, to enhance the thermal comfort of occupant 412 upon his or her return to vehicle cabin 302 of vehicle 101. In some embodiments, display 110 may enable occupant 412 to specify different preferences for when parameters of HVAC system 116 should be adjusted, e.g., when occupant 412 is determined to leave vehicle 101.

Figure 6:
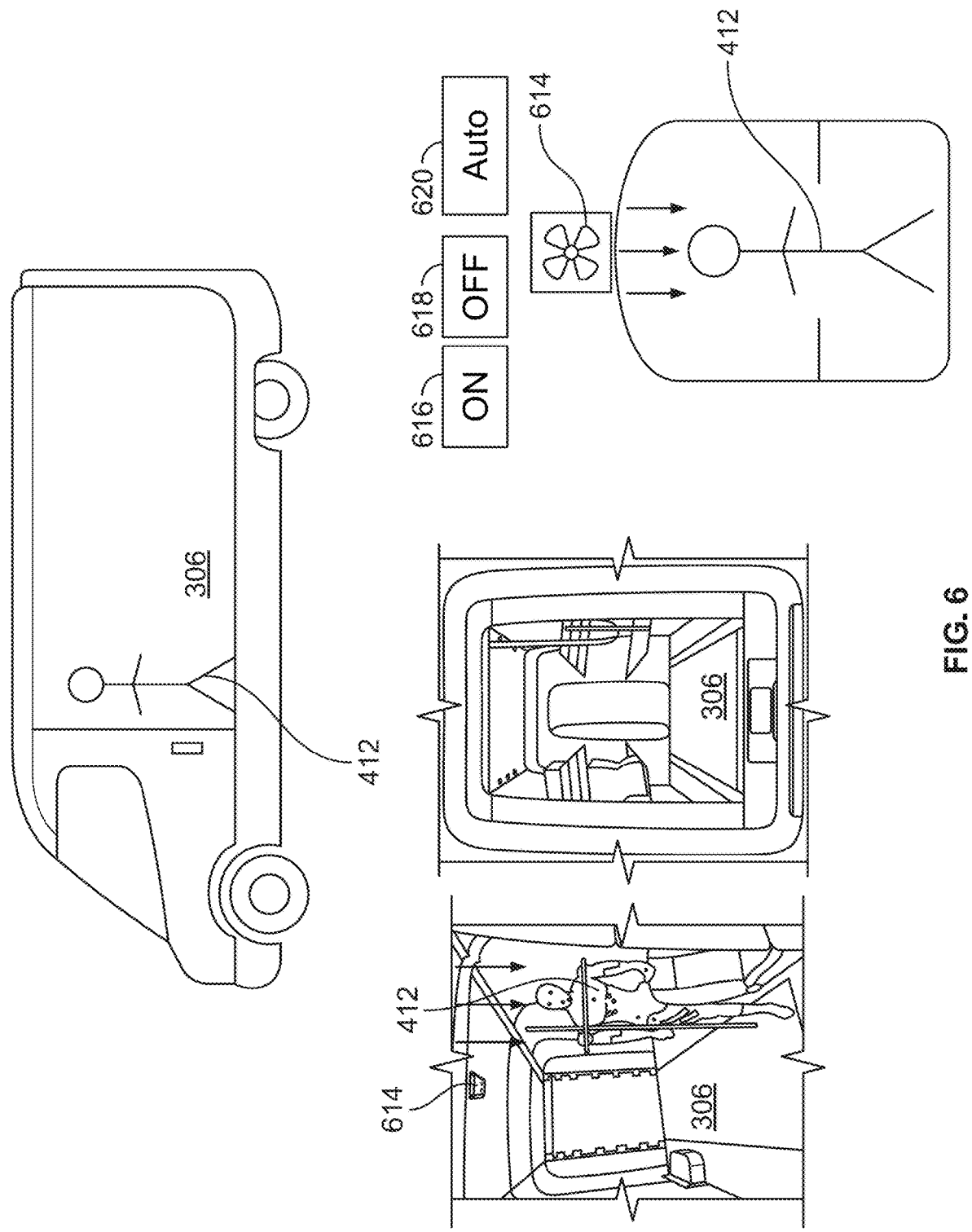
FIG. 6 shows an illustrative cargo zone of a vehicle, in accordance with some embodiments of the present disclosure.

FIG. 6 shows an illustrative cargo zone of a vehicle, in accordance with some embodiments of the present disclosure. As shown in FIG. 6, vehicle occupant 412 may be present in cargo zone 306 of vehicle 101, e.g., retrieving a package to be delivered. In some embodiments, cargo zone 306 may include one or more fans 614 (e.g., located at a roof of vehicle 101, or any other suitable location) or any other suitable HVAC component (e.g., a system configured to suck air out of cargo zone 306, etc.), and processing circuitry 102 may receive selection of one or more settings 616, 618, 620 with respect to cargo zone 306, to turn on conditioning or ventilation for when occupant 412 is detected in cargo zone 306, e.g., when the bulkhead door or cargo door is determined to be open and/or based on a camera capturing an image of occupant 412 in cargo zone 306 and/or based on GPS destinations or a delivery schedules, or based on any other suitable sensor measurement, or any combination thereof. The user may select whether he or she desires such cargo HVAC system to always be on, or only when he or she is in (or not in) cargo zone 306, and/or how much air or conditioning is desired in cargo zone 306. For example, if occupant 412 plans to spend a large amount of time sorting through or organizing packages, he or she can set the cargo zone HVAC settings accordingly, e.g., to utilize air circulation to prevent the air in cargo zone 306 from becoming stale.

In some embodiments, the HVAC system in cargo zone 306 may produce a significant amount of noise, and it may be uncomfortable for vehicle occupant to be blasted with a significant amount of air upon entering cargo zone 306, and thus is may be desirable to turn off the HVAC system in cargo zone 306 (e.g., particularly in colder ambient temperatures). In some embodiments, a digital assistant (e.g., Amazon Alexa, or any other suitable digital assistant) microphone may be provided in cargo zone 306, and thus is may be desirable to reduce noise and acoustic fatigue of the driver when present in cargo zone 306 (e.g., by turning off or de-rating the HVAC component) to enable occupant 412 to transmit voice commands to the digital assistant microphone, e.g., to assist in sorting through packages in cargo zone 306. In some embodiments, the HVAC component in cargo zone 306 may be re-rated or turned back on when the bulkhead door closes. In some embodiments, the HVAC system in cargo zone 306 is only utilized if solar irradiance is above a certain threshold.

Figure 7:
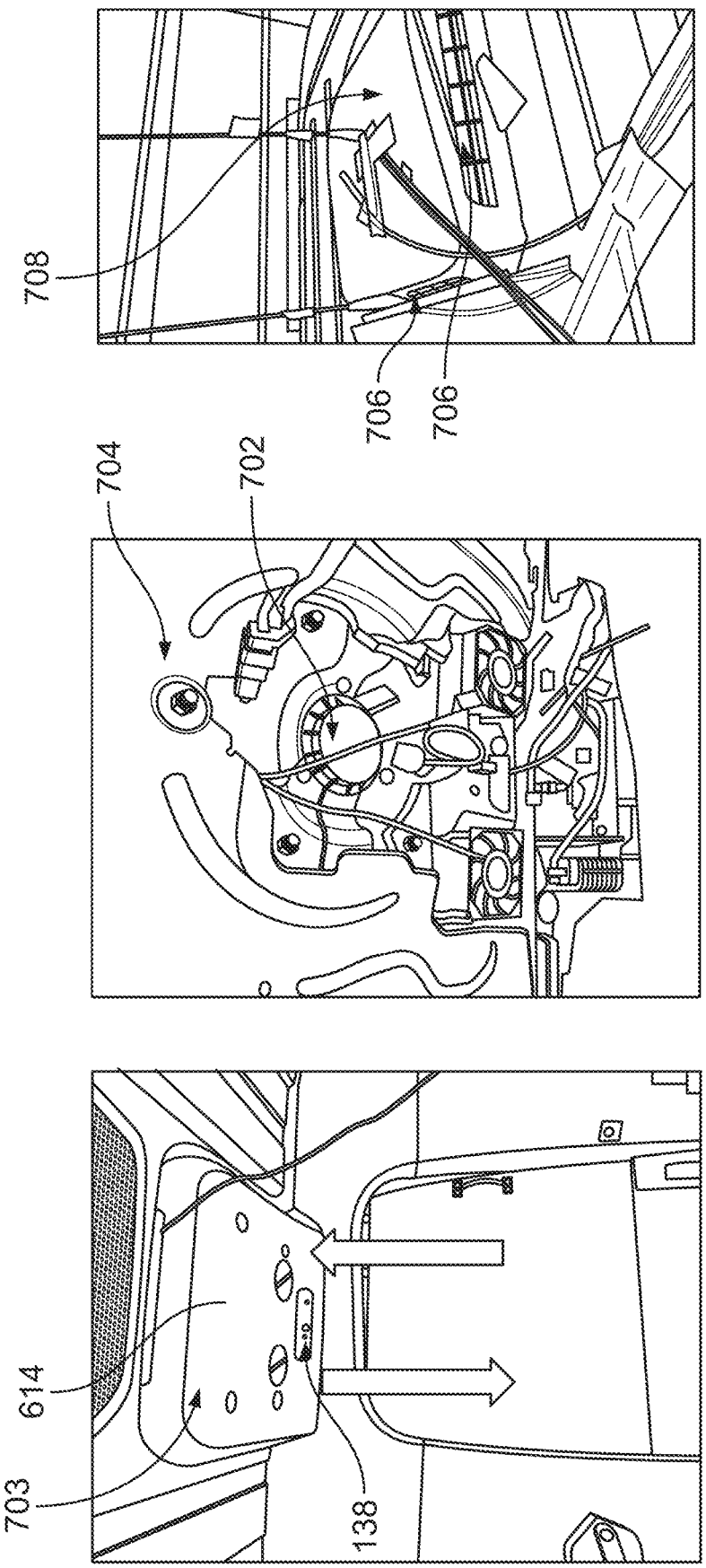
FIG. 7 shows portions of an illustrative cargo zone of a vehicle, in accordance with some embodiments of the present disclosure.

FIG. 7 shows portions of an illustrative cargo zone of a vehicle, in accordance with some embodiments of the present disclosure. Cargo zone 306 may comprise one or more fans 614 or any other suitable HVAC components, or any combination thereof. Fan 614 may be part of fan assembly 704 comprising a cover. In some embodiments, fan 614 may comprise GPS antenna 702, to enable cargo zone 306 to take into account a current location relative to a location of vehicle occupant 412 and/or determine a delivery is taking place or is about to take place. In some embodiments, fan assembly 704 may comprise sensor 132 (e.g., a camera), which may be used to track a location of occupant 412 and determine if he or she is located in cargo zone 306. Roof insert 703 may be used to mount fan 614 to a roof of vehicle 101. Air inlets 706 of any suitable size or shape may be included in cargo zone 306 to provide ventilation to cargo zone 306, and outlet cover 708 may be a darker color to promote high solar absorption. Fan 614 may employ a pusher mode in which air is blown out to cargo zone 306, or a suction mode in which air is sucked out of cargo zone 306.

Figure 8:
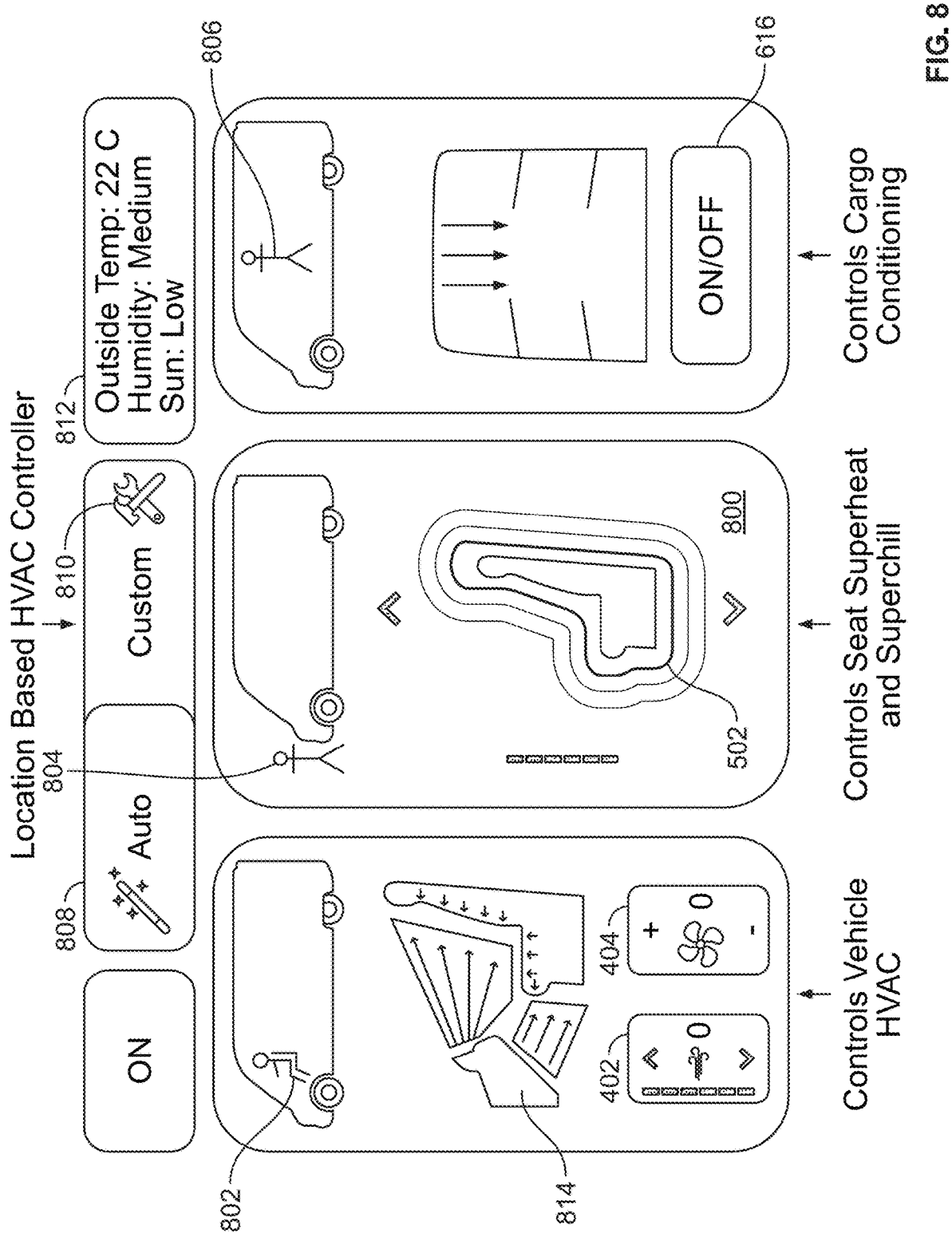
FIG. 8 shows portions of an illustrative HVAC climate control interface, in accordance with some embodiments of the present disclosure.

FIG. 8 shows portions of an illustrative HVAC climate control interface, in accordance with some embodiments of the present disclosure. HVAC climate control interface 800 may be provided via display 110 or user device 154 or any other suitable device, or any combination thereof. HVAC climate control interface 800 may indicate the operators position within the vehicle, based on instructions received from processing circuitry 102 (e.g., via I/O circuitry 108). For example, interface 800 may comprise an indication 802 that occupant 412 is in vehicle cabin 302, an indication 804 that occupant 412 has left vehicle cabin 302 to an environment outside vehicle 101, and an indication 806 that occupant 412 is located in cargo zone 306 of vehicle 101. Interface 800 may provide HVAC settings associated with each respective indications of occupant physical locations 802, 804, 806. For example, interface 800 enables occupant 412 to choose an HVAC setpoint for each of their physical locations 802, 804, 806 relative to vehicle 101, to instruct HVAC system 116 to adapt to the circumstances (e.g., a dynamic delivery scenario, or any other suitable scenario), to provide maximum energy efficiency and thermal comfort.

Interface 800 may comprise icon 808, selectable to cause HVAC system 116 to enter an automated HVAC mode. For example, processing circuitry 102, in response to determining that icon 808 has been selected, may set HVAC system 116 to recommended temperature setpoints (e.g., presets) or HVAC settings for the given conditions (e.g., ambient temperatures, whether the door is left open, or any other suitable condition, or any combination thereof). In some embodiments, such recommended temperature setpoints or HVAC settings may be determined based on simulation and/or test results, designed to maintain positive thermal comfort (e.g., during deliveries). Such HVAC settings may be tuned or modified by the occupant at any time by driver, e.g., by selecting icon 810. Thus, many driver may achieve thermal comfort with a single button push associated with icon 808, and may conveniently manually modify such settings to his or her preference. The settings associated with icon 808 may dynamically change throughout the day, e.g., based on ambient weather conditions.

In some embodiments, if a driver selects a more energy consuming setpoint than predicted (e.g., higher blower, higher heating/cooling, or any other suitable settings, or any combination thereof), processing circuitry 102 may accept the new settings, but may de-rate one or more HVAC components when the driver is out, depending on conditions (e.g., if a door is left open, the user setting may be discarded). In some embodiments, if a driver selects a less energy consuming setpoint than predicted, processing circuitry 102 may accept the new settings, and implement such settings since it may conserve more energy than the recommended settings. In some embodiments, certain features (e.g., out of cabin conditioning or cargo conditioning) may be disabled, e.g., based on the ambient temperature detected, or any other suitable condition. Interface 800 may comprise indication 812 of ambient conditions, e.g., temperature, humidity, solar irradiance, or any other suitable condition, or any combination thereof. Interface 800 may comprise icon 814 at which the user may indicate various HVAC settings with respect to different air vents or portions of vehicle cabin 302 (e.g., request to concentrate air on a face of the user).

Figure 9A:
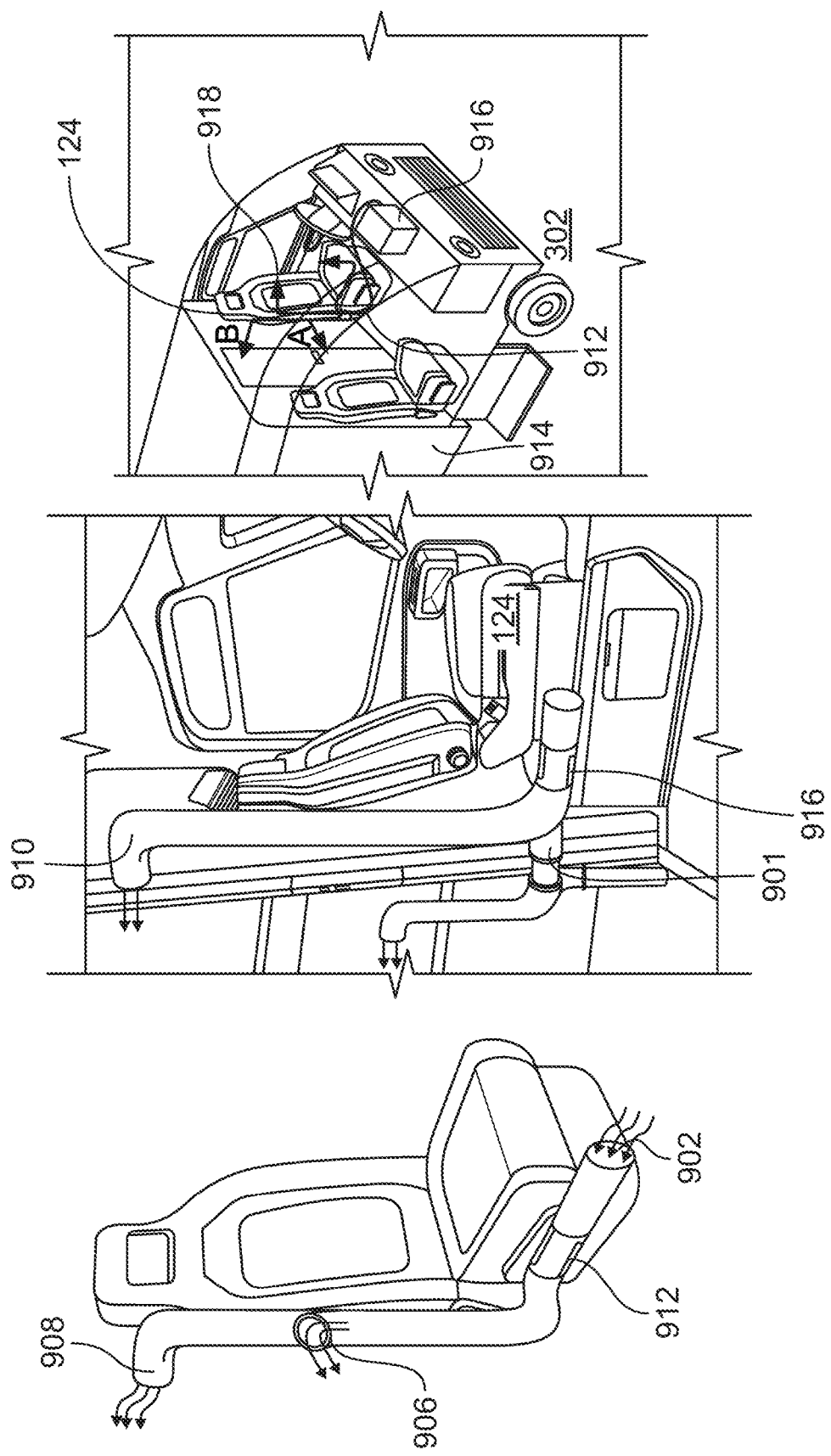
FIGS. 9A-9C shows an illustrative arrangement for providing HVAC capability to a cargo zone of a vehicle, in accordance with some embodiments of the present disclosure.
Figure 9B:
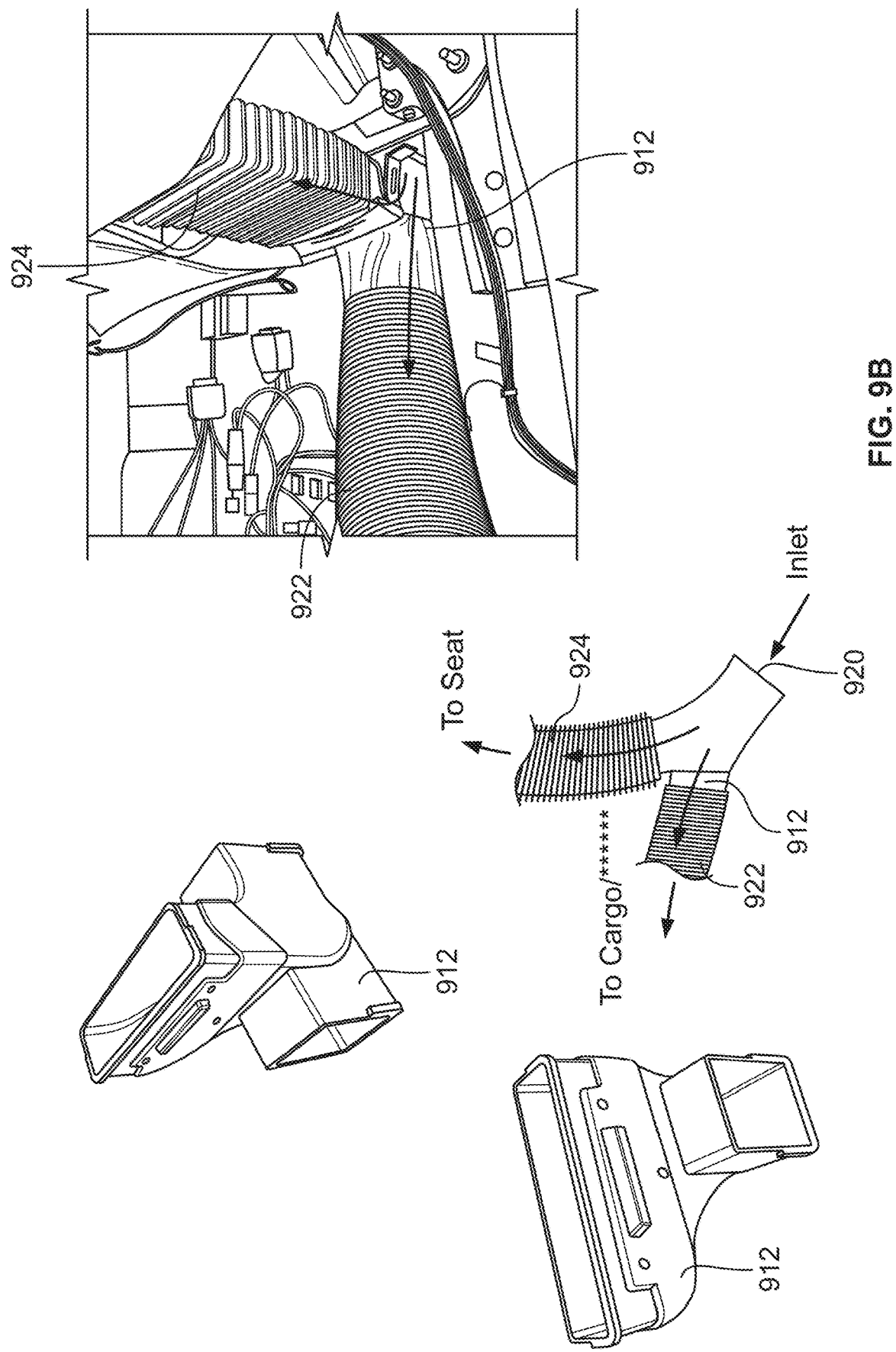
Figure 9C:
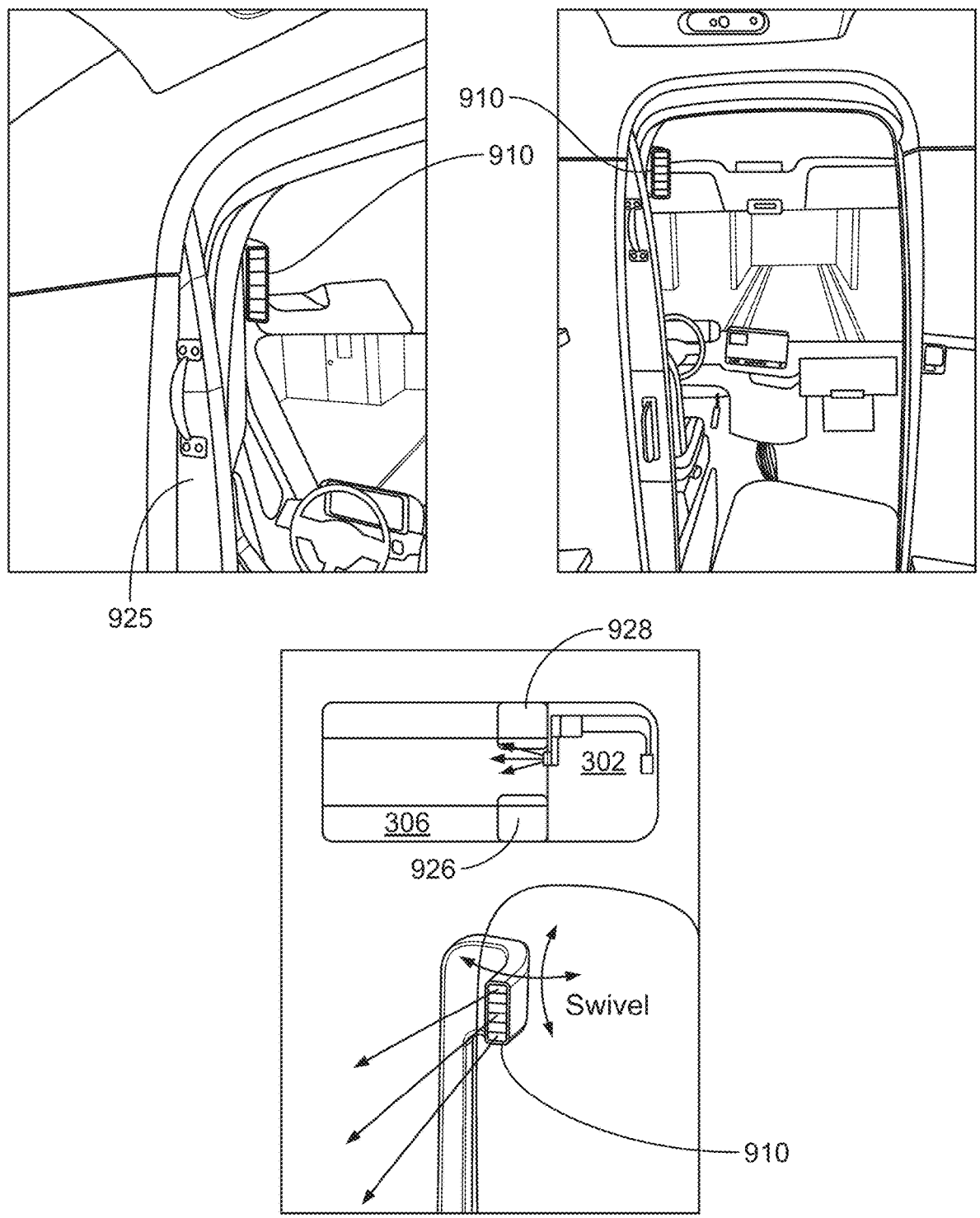

FIGS. 9A-9C shows an illustrative arrangement for providing HVAC capability to a cargo zone of a vehicle, in accordance with some embodiments of the present disclosure. As shown in FIG. 9A, a conduit 901 may be connected to HVAC system 116, and conduit 901 may extend through a bulkhead door separating cargo zone 306 and vehicle cabin 302, to provide conditioned or unconditioned air to cargo zone 306. Conduit 901 may comprise inlet 902 to receive air, and one or more outlets 906, 908 through which the air may be directed into cargo zone 306. Conduit 901 may comprise splitter or junction 912 which may connect a duct associated with seat 124 to a duct extending into cargo zone 306. Splitter or junction 912 may comprise a control vane selector, to control airflow through conduit 901. In some embodiments, conduit 901 may be included as part of, and/or be an extension of, a duct, or any other suitable conduit, as discussed in more detail in commonly-owned application Ser. No. 17/390,710 to Feltham et al., the contents of which are hereby incorporated by reference herein in their entirety.

In some embodiments, a secondary outlet may be added to a component (e.g., a plastic diverter, or any other suitable component of any other suitable material, or any combination thereof) at the back of the seat duct. In some embodiments, a flex hose may be attached to a molded hard-duct that is integrated into a storage bin. In some embodiments, conduit 901 may comprise an integrated booster fan 916. In some embodiments, conduit 901 may travel up the bulkhead cargo door, and behind a trim of the door, until conduit 901 pokes out around the open cargo door. In some embodiments, a swivel head 910 of conduit 901 may swivel to point at a primary loading zone. In some embodiments, swivel head 910 may correspond to, or be a part of, outlet 908. As shown at a right-hand portion of FIG. 9, a main HVAC module 917 may be connected to seat conditioning duct or loop 918, associated with main driver seat 124, which may be connected to the duct extending to cargo zone 306 and/or co-pilot seat 914 via junction 912. In some embodiments, co-pilot seat 914, which may be provided with conditioned or unconditioned air, or any other suitable heating or cooling capability, or any combination thereof.

As shown in FIG. 9B, junction 912 may comprise inlet 920 to receive air, outlet 922 to cargo zone 306 and output 924 to seat 124. In some embodiments, junction 912 may comprise a selector component. In some embodiments, outlet 922 may extend through an open cargo door, to any suitable location (e.g., a primary loading zone, or any other suitable location, or any combination thereof).

As shown in FIG. 9C, conduit 901 may comprise swivel head 910 which may be directed towards any suitable portion of cargo zone 306, and may extend through or in a vicinity of bulkhead door 925. For example, swivel head 910 may direct air to loading zone 926 and/or loading zone 928. In some embodiments, air may be selectively provided via swivel head 910 from HVAC system 116 based on feedback from cargo temperature sensor 135 and/or any other suitable sensor (e.g., a door sensor associated with bulkhead door 925, outputting a signal indicting the door is open and thus a vehicle occupant is likely inside cargo zone 306. In some embodiments, in response to sensing the occupant is inside, or is likely inside, cargo zone 306, HVAC system 116 may switch conditioning or ventilation or any other HVAC operation, or any combination thereof, to cargo zone 306, e.g., from vehicle cabin 302 if occupant 412 is determined to have moved from vehicle cabin 302 to cargo zone 306.

Figure 10:
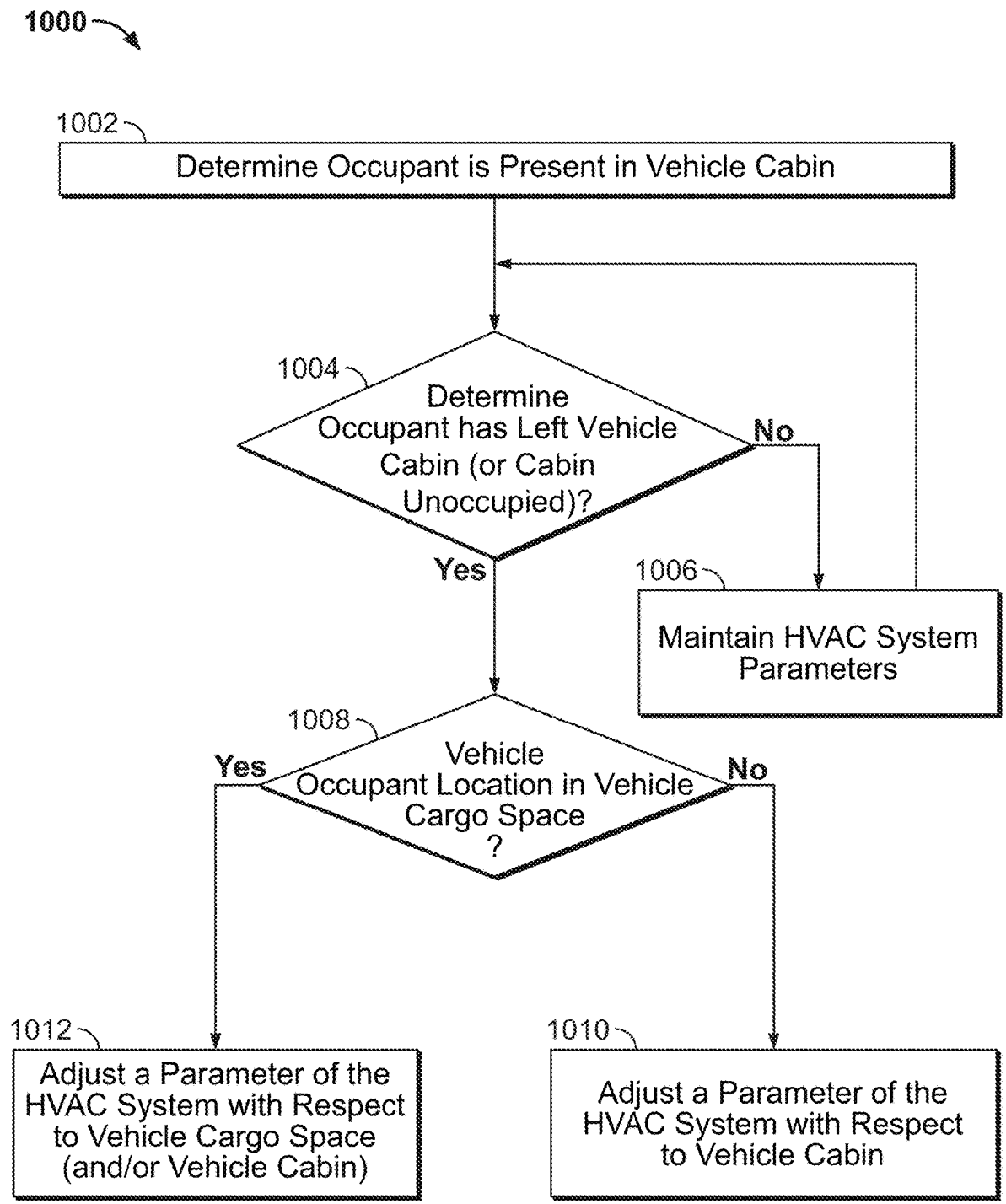
FIG. 10 shows a flowchart of an illustrative process for adjusting a parameter of an HVAC system, in accordance with some embodiments of the present disclosure.

FIG. 10 shows a flowchart 1000 of an illustrative process for adjusting a parameter of an HVAC system, in accordance with some embodiments of the present disclosure. Process 1000 may be executed at least in part by processing circuitry 102 of vehicle 101, and/or circuitry of HVAC system 116, or any other suitable circuitry, or any combination thereof.

At 1002, processing circuitry 102 of vehicle 101 may determine that vehicle occupant 412 is present in vehicle cabin 302 of vehicle 101. Processing circuitry 102 may make this determination based on signals received from one or more sensors. For example, processing circuitry 102 may receive a signal from pressure sensor 134 indicating that vehicle occupant 412 is sitting in ventilated seat 124, or processing circuitry 102 may receive any other suitable sensor signals indicating the presence of occupant 412 in vehicle cabin 302.

At 1004, processing circuitry 102 of vehicle 101 may determine whether vehicle occupant 412 has left vehicle cabin 302 of vehicle 101. Processing circuitry 102 may make this determination based on signals received from one or more sensors. For example, processing circuitry 102 may receive a signal from pressure sensor 134 indicating that vehicle occupant 412 is no longer sitting in ventilated seat 124, or processing circuitry 102 may receive any other suitable sensor signals indicating the presence of occupant 412 in vehicle cabin 302. In some embodiments, at 1004, processing circuitry 102 of vehicle 101 may determine whether vehicle cabin 302 of vehicle 101 is unoccupied. For example, vehicle 101 may be partially of fully autonomous, and step 1002 may optionally be omitted. As another example, if at least one occupant remains in vehicle cabin 302 of vehicle 101 when occupant 412 exits vehicle 101, it may be desirable to maintain the current HVAC settings.

In some embodiments, processing circuitry 102 may additionally determine whether HVAC system 116 of vehicle 101 is in operation or was in operation when occupant 412 left vehicle cabin 302 of vehicle 101. For example, prior to leaving vehicle cabin 302, one or more selections of HVAC settings may have been received from vehicle occupant 412 via interface 800 of FIG. 8, interface 400 of FIG. 4, interface 500 of FIG. 5, or any suitable interface, or any combination thereof.

If processing circuitry 102 determines that occupant 412 still remains in vehicle cabin 302, processing may proceed to 1006, where current HVAC system parameters may be maintained. If processing circuitry 102 determines that occupant 412 does not remain in vehicle cabin 302, processing may proceed to 1008.

At 1008, processing circuitry 102 of vehicle 101 may determine whether vehicle occupant 412 is present in vehicle cargo space 306. For example, processing circuitry 102 may perform this determination based on a signal received from a sensor associated with bulkhead door 925 or a camera in cargo space 306, or any other suitable sensor or indication, or any combination thereof. If processing circuitry 102 determines that vehicle occupant 412 is in cargo space 306, processing may proceed to 1012; otherwise processing may proceed to 1010 based on the assumption that occupant 412 has exited vehicle 101 to an environment exterior to vehicle 101.

At 1010, processing circuitry 102 may adjust a parameter of HVAC system 116 with respect to vehicle cabin 302. For example, such adjustment may occur while occupant 412 remains outside of vehicle 101, e.g., delivering a package to a customer. For example, processing circuitry 102 may turn off HVAC system 116, or de-rate HVAC system 116, to conserve energy while occupant 412 is outside of vehicle 101. In some embodiments, adjusting the parameter may comprise directing thermal energy to ventilated seat 124 of vehicle 101 (e.g., instead of blowing at least a portion of such energy via air vent 12), which may store thermal energy and provide thermal comfort to occupant 412 upon his or her return. In some embodiments, whether (and how) to perform the adjustment may be impacted by the ambient temperature or other ambient condition and/or whether a vehicle door was left open, and any other suitable parameter, or any combination thereof.

At 1012, processing circuitry 102 may adjust a parameter of HVAC system 116 with respect to vehicle cargo space 306. For example, processing circuitry 102 may cause HVAC system 116 to perform heating or cooling operations, e.g., based on an ambient temperature, to provide thermal comfort to occupant 412, e.g., as he or she is sorting through delivery packages. In some embodiments, processing circuitry 102 may reduce ventilation or other operations to reduce an amount of noise in cargo space 306, e.g., to enable occupant 412 to interact with a digital assistant which may be present in cargo space 306. In some embodiments, processing circuitry 102 may still adjust HVAC parameters for vehicle cabin 302 as in 1010, since occupant 412 is likely to return to vehicle cabin 302 after sorting through packages and/or after performing a delivery.

Figure 11:
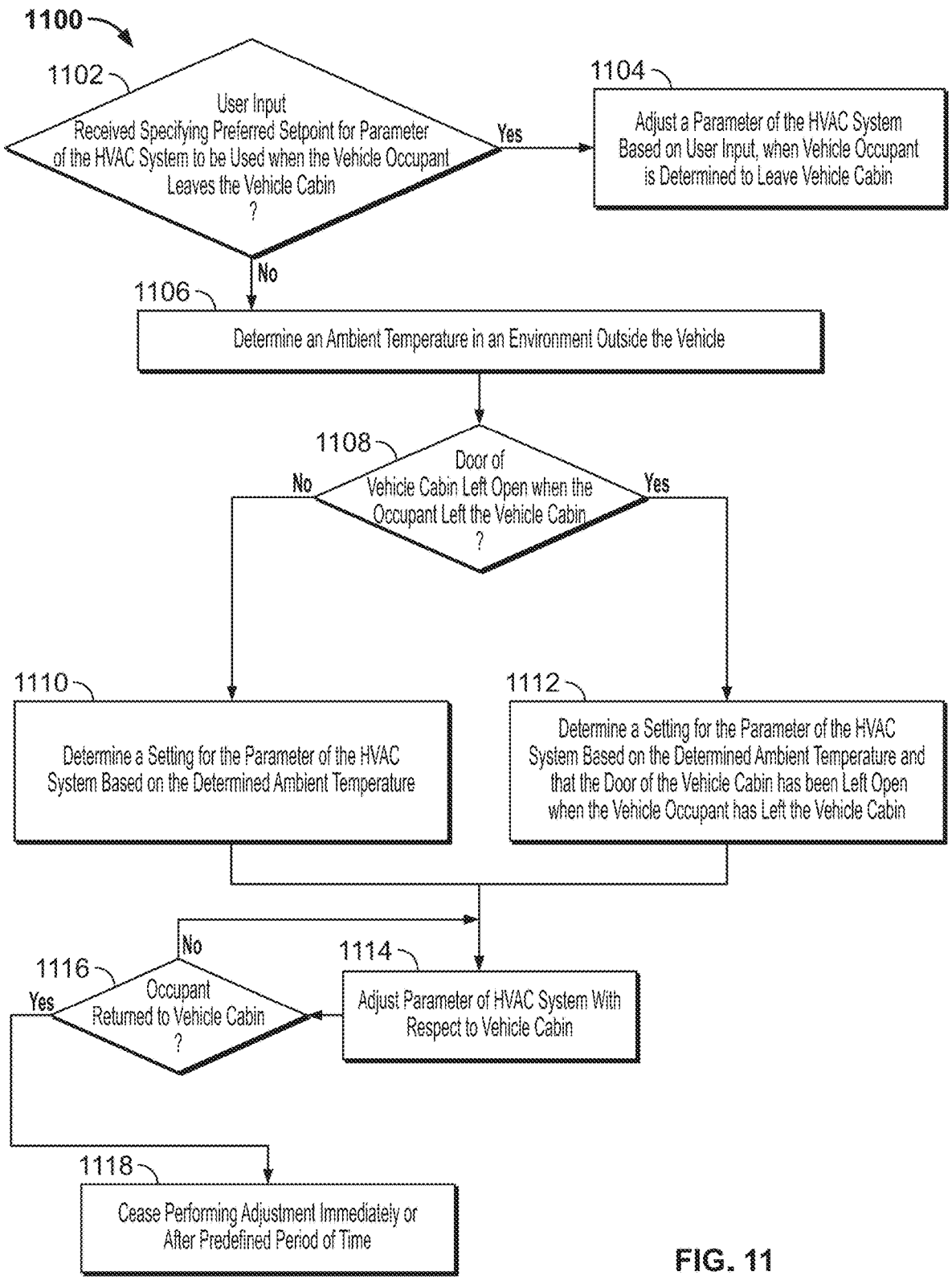
FIG. 11 shows a flowchart of an illustrative process for adjusting a parameter of an HVAC system, in accordance with some embodiments of the present disclosure.

FIG. 11 shows a flowchart 1100 of an illustrative process for adjusting a parameter of an HVAC system, in accordance with some embodiments of the present disclosure. Process 1100 may be executed at least in part by processing circuitry 102 of vehicle 101, and/or circuitry of HVAC system 116, or any other suitable circuitry, or any combination thereof.

At 1102, processing circuitry 102 may determine whether user input has been received (e.g., via I/O circuitry 108 or via user device 154, or any other suitable deice, or any combination thereof) specifying a preferred setting for a parameter of the HVAC system to be used when vehicle occupant 412 leaves vehicle cabin 302. For example, occupant 412 may specify (via interface 800 of FIG. 8, interface 400 of FIG. 4, interface 500 of FIG. 5, or any suitable interface, or any combination thereof) that ventilated seat 124 should be heated or cooled at a certain setting when occupant 412 leaves vehicle cabin 302, or air vent 120 should be de-rated, or specify any other suitable parameter, or any combination thereof.

At 1104, if such user input was received at 1102, HVAC system 116 may be adjusted in accordance with the user input, when occupant 412 is determined to have left vehicle cabin 302. In some embodiments, processing may proceed to 1106 regardless of whether such user input is received.

At 1106, processing circuitry 102 may determine an ambient temperature in an environment outside vehicle 101. For example, the ambient temperature may be determined based on a signal or indication of the temperature received from ambient temperature sensor 137, or received from any suitable source (e.g., user device 154 or server 156 or any combination thereof).

At 1108, processing circuitry 102 may determine whether a door of vehicle cabin 302 was left open when occupant 412 left vehicle cabin 302. If so, processing may proceed to 1110; otherwise processing may proceed to 1112. The determination of whether door 406 (or any other suitable door, window or other component, or any combination thereof) has been left open may be based on a signal or indication received from door sensor 140, or any other suitable sensor, or any combination thereof. If an affirmative determination is made at 1108, processing may proceed to 1112; otherwise processing may proceed to 1110.

At 1110, processing circuitry 102 may determine a setting for a parameter of HVAC system 116 based on the determined ambient temperature. For example, processing circuitry 102 may compare the measured ambient temperature to certain ambient temperature thresholds or ambient temperature ranges, and determine whether to de-rate, maintain, or re-rate one or more HVAC components (e.g., air vent 120, ventilated seat 124, and/or any other suitable component). In some embodiments, processing circuitry 102 may reference a lookup table (e.g., Table 1 discussed above) to determine a particular action to take, using any suitable number of parameters. In some embodiments, such actions may depend at least in part on the current HVAC settings and/or current measured temperature in vehicle cabin 302 or cargo space 306.

At 1112, processing circuitry 102 may determine a setting for a parameter of HVAC system 116 based on the determined ambient temperature and/or the determination that a vehicle door has been left open. For example, processing circuitry 102 may determine that utilizing air blowers or air vent 120 while door 406 is open (e.g., during a delivery being performed by occupant 412) would provide little benefit to occupant 412 upon his return, since such air would merely be blown into the outside environment through the open door. Instead, processing circuitry 102 may determine to direct thermal energy to be stored in ventilated seat 124, which may be less susceptible to losing energy to the outside environment. In some embodiments, processing circuitry 102 may reference a lookup table to determine a particular action to take, using any suitable number of parameters.

At 1114, processing circuitry 102 may adjust the parameter of HVAC system 116 on the basis of 1110 or 1112. In some embodiments, user input received at 1102 may be taken into consideration in certain circumstances (e.g., if the setting associated with the user input would receive less energy than the recommended setting determined at 1110 or 1112, or in any other suitable circumstance). At 1116, after such parameter has been adjusted or is in the process of being adjusted, processing circuitry 102 may determine whether occupant 412 has returned to vehicle cabin 302 (e.g., based on one or more sensor signals, as discussed in connection with FIG. 1). If so, processing may proceed to 1118, otherwise processing may return to 1114.

At 1118, processing circuitry 102 may cause HVAC system 116 to cease performing adjustment of the parameter immediately or after a predefined period of time. For example, if the adjustment corresponds to boosting an amount by which ventilated seat 124 should be heated or cooled, such operation may be ceased to avoid the seat becoming uncomfortably hot. As another example, if the vehicle door was left open and the temperature of vehicle cabin 302 is very cold, it may provide thermal comfort to occupant 412 if a higher heating operation were to be performed for a predefined period of time (e.g., while occupant 412 drives to a next delivery location). In some embodiments, if processing circuitry 102 determines that the door was left open and subsequently closed by the driver, and the driver remains outside, then the process may proceed to 1110 to determine a new setting.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle, comprising:
   a heating, ventilation, and air conditioning (HVAC) system;
   a digital assistant device comprising a microphone to receive voice commands, wherein the microphone is located in a cargo space of the vehicle; and
   processing circuitry configured to:
      determine, based on sensor data, that a door separating the cargo space of the vehicle from a cabin of the vehicle is now open after being closed;
      determine a vehicle occupant has left the cabin of the vehicle and is now in the cargo space of the vehicle while the HVAC system of the vehicle is in operation based on determining that the door separating the cargo space of the vehicle from the cabin of the vehicle is now open after being closed;
      in response to determining the vehicle occupant has left the cabin and is now in the cargo space while the HVAC system of the vehicle is in operation, reduce a power output of the HVAC system with respect to the cargo space, wherein the reducing of the power output of the HVAC system reduces a level of noise in the cargo space caused by the HVAC system, and wherein the processing circuitry is configured to reduce the power output of the HVAC system to reduce noise picked up by the microphone to enable the microphone to detect a voice command from the vehicle occupant in the cargo space;
      determine the vehicle occupant has left the cargo space and is back in the cabin of the vehicle based on determining that the door separating the cargo space of the vehicle from the cabin of the vehicle is now closed after being open; and
      in response to determining that the vehicle occupant has left the cargo space and is back in the cabin of the vehicle, increase a power output of the HVAC system with respect to the cargo space.

2. The vehicle of claim 1, wherein the processing circuitry is further configured to:
determine an ambient temperature in an environment of the vehicle;
determine a setting for the HVAC system based at least on the ambient temperature; and
reduce the power output of the HVAC system to the determined setting.

3. The vehicle of claim 1, wherein the door is a first door, and wherein the processing circuitry is further configured to:
determine an ambient temperature in an environment of the vehicle;
determine a second door of the cabin is left open; and
reduce the power output of the HVAC system based at least on the ambient temperature and the second door of the vehicle left open.

4. The vehicle of claim 1, wherein:
the HVAC system comprises an air vent configured to provide conditioned air; and
the processing circuitry is further configured to reduce the power output of the HVAC system by turning off the air vent and directing thermal energy to a vehicle seat of the vehicle occupant.

5. The vehicle of claim 1, wherein the processing circuitry is configured to:
modify a temperature setpoint of the HVAC system; and
reduce the power output of the HVAC system based at least on the modified temperature setpoint.

6. The vehicle of claim 1, wherein the processing circuitry is further configured to:
determine an input specifying a preferred setting for a parameter of the HVAC system when the vehicle occupant has left the cabin; and
reduce the power output of the HVAC system based on the input.

7. The vehicle of claim 1, wherein the processing circuitry is configured to:
perform the determination that the vehicle occupant has left the cabin of the vehicle and is now in the cargo space of the vehicle at a first time, wherein reducing the power output of the HVAC system with respect to the cargo space is a first adjustment;
at a second later time, determine a location of the vehicle occupant has changed from the cabin to a location outside the vehicle; and
perform a second adjustment to the power output of the HVAC system based on determining the location of the vehicle occupant has changed from the cabin to outside the vehicle.

8. The vehicle of claim 1, wherein the processing circuitry is configured to reduce the power output of the HVAC system by reducing a speed of a fan of the HVAC system, which reduces the level of noise in the cargo space caused by the fan.

9. The vehicle of claim 1, wherein the processing circuitry is further configured to direct thermal energy to a vehicle seat of the vehicle occupant in response to determining the vehicle occupant has left the cabin and is now in the cargo space while the HVAC system of the vehicle is in operation.

10. A heating, ventilation, and air conditioning (HVAC) system of a vehicle, comprising:
input/output (I/O) circuitry configured to:
monitor a sensor signal that indicates whether a cabin of the vehicle is unoccupied, wherein the vehicle comprises a digital assistant device comprising a microphone to receive voice commands, and wherein the microphone is located in a cargo space of the vehicle; and
processing circuitry configured to:
determine, based on sensor data, that a door separating the cargo space of the vehicle from a cabin of the vehicle is now open after being closed;
determine, based on the sensor signal, the cabin is unoccupied based on determining that a vehicle occupant has left the cabin of the vehicle and is now in the cargo space of the vehicle while the HVAC system of the vehicle is in operation based on determining that the door separating the cargo space of the vehicle from the cabin of the vehicle is now open after being closed;
in response to determining that the cabin is unoccupied, reduce a power output of the HVAC system with respect to the cargo space, wherein the reducing of the power output of the HVAC system reduces a level of noise in the cargo space caused by the HVAC system, and wherein the processing circuitry is configured to reduce the power output of the HVAC system to reduce noise picked up by the microphone to enable the microphone to detect a voice command from the vehicle occupant in the cargo space;
determine the vehicle occupant has left the cargo space and is back in the cabin of the vehicle based on determining that the door separating the cargo space of the vehicle from the cabin of the vehicle is now closed after being open; and
in response to determining that the vehicle occupant has left the cargo space and is back in the cabin of the vehicle, increase a power output of the HVAC system with respect to the cargo space.

11. The HVAC system of claim 10, wherein the processing circuitry is further configured to:
determine an ambient temperature in an environment of the vehicle;
determine a setting for the HVAC system based at least on the ambient temperature; and
reduce the power output of the HVAC system to the determined setting.

12. The HVAC system of claim 10, wherein the door is a first door, and wherein the processing circuitry is further configured to:
determine an ambient temperature in an environment of the vehicle;
determine a second door of the cabin is left open; and
reduce the power output of the HVAC system based at least on the ambient temperature and the second door of the vehicle left open.

13. The HVAC system of claim 10, wherein:
the HVAC system comprises an air vent configured to provide conditioned air; and
the processing circuitry is further configured to reduce the power output of the HVAC system by turning off the air vent and directing thermal energy to a vehicle seat.

14. The HVAC system of claim 10, wherein the processing circuitry is further configured to:
determine an input specifying a preferred setting for a parameter of the HVAC system when the cabin is unoccupied; and
reduce the power output of the HVAC system based on the input.

15. The HVAC system of claim 10, wherein the processing circuitry is further configured to:
perform the determination that the vehicle occupant has left the cabin of the vehicle and is now in the cargo space of the vehicle at a first time, wherein reducing the power output of the HVAC system with respect to the cargo space is a first adjustment;
at a second later time, determine the cabin is unoccupied based on determining a location of the vehicle occupant has changed from the cabin to a location outside the vehicle; and
perform a second adjustment to the power output of the HVAC system based on determining the location of the vehicle occupant has changed from the cabin to outside the vehicle.

16. The HVAC system of claim 10, wherein the processing circuitry is configured to reduce the power output of the HVAC system by reducing a speed of a fan of the HVAC system, which reduces the level of noise in the cargo space caused by the fan.

17. A method, comprising:
determining, by processing circuitry, whether a cabin of a vehicle is unoccupied, wherein the vehicle comprises a digital assistant device comprising a microphone to receive voice commands, and wherein the microphone is located in a cargo space of the vehicle;
determining, based on sensor data, that a door separating the cargo space of the vehicle from the cabin of the vehicle is now open after being closed;
determining the cabin is unoccupied based on determining that a vehicle occupant has left the cabin of the vehicle and is now in the cargo space of the vehicle while a heating, ventilation, and air conditioning (HVAC) system of the vehicle is in operation based on determining that the door separating the cargo space of the vehicle from the cabin of the vehicle is now open after being closed;
in response to determining that the cabin is unoccupied, reducing, by the processing circuitry, a power output of the HVAC system of the vehicle with respect to the cargo space, wherein the reducing of the power output of the HVAC system reduces a level of noise in the cargo space caused by the HVAC system, and wherein the processing circuitry is configured to reduce the power output of the HVAC system to reduce noise picked up by the microphone to enable the microphone to detect a voice command from the vehicle occupant in the cargo space;
determining the vehicle occupant has left the cargo space and is back in the cabin of the vehicle based on determining that the door separating the cargo space of the vehicle from the cabin of the vehicle is now closed after being open; and
in response to determining that the vehicle occupant has left the cargo space and is back in the cabin of the vehicle, increasing a power output of the HVAC system with respect to the cargo space.

18. The method of claim 17, further comprising:
determining an ambient temperature in an environment of the vehicle;
determining a setting for the HVAC system based at least on the ambient temperature; and
reducing the power output of the HVAC system to the determined setting.

19. The method of claim 17, wherein the processing circuitry is configured to:
modify a temperature setpoint of the HVAC system; and
reducing the power output of the HVAC system based at least on the modified temperature setpoint.

20. The method of claim 17, wherein reducing the power output of the HVAC system comprises reducing a speed of a fan of the HVAC system, which reduces the level of noise in the cargo space caused by the fan.

* * * * *